(12) United States Patent
Ding et al.

(10) Patent No.: US 7,877,642 B2
(45) Date of Patent: Jan. 25, 2011

(54) AUTOMATIC SOFTWARE FAULT DIAGNOSIS BY EXPLOITING APPLICATION SIGNATURES

(75) Inventors: Xiangdong Ding, Columbus, OH (US); Hai Huang, White Plaines, NY (US); Raymond B. Jennings, Ossining, NY (US); Yaoping Roan, White Plaines, NY (US); Sambit Sahu, Hopewell Junction, NY (US); Anees A. Shaikh, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 12/255,937

(22) Filed: Oct. 22, 2008

(65) Prior Publication Data

US 2010/0100774 A1  Apr. 22, 2010

(51) Int. Cl.
*G06F 11/00* (2006.01)

(52) U.S. Cl. .............................. 714/38; 714/45; 717/133
(58) Field of Classification Search .................... 714/38, 714/39, 45; 717/130–133
See application file for complete search history.

(56) References Cited

U.S. PATENT DOCUMENTS

| | | | |
|---|---|---|---|
| 7,386,839 B1* | 6/2008 | Golender et al. | 717/131 |
| 7,496,898 B1* | 2/2009 | Vu | 717/127 |
| 7,681,182 B1* | 3/2010 | Mistry et al. | 717/132 |
| 2002/0100025 A1* | 7/2002 | Buechner et al. | 717/131 |
| 2005/0262399 A1* | 11/2005 | Brown et al. | 714/38 |
| 2007/0038895 A1* | 2/2007 | Biegert et al. | 714/38 |
| 2008/0178161 A1* | 7/2008 | Cates | 717/133 |
| 2008/0295058 A1* | 11/2008 | Srinivasan et al. | 716/18 |
| 2008/0301502 A1* | 12/2008 | Harsha et al. | 714/37 |
| 2008/0313502 A1* | 12/2008 | Rand Mcfadden et al. | 714/45 |
| 2010/0011243 A1* | 1/2010 | Locasto et al. | 714/15 |
| 2010/0088683 A1* | 4/2010 | Golender et al. | 717/128 |

* cited by examiner

*Primary Examiner*—Bryce P Bonzo
(74) *Attorney, Agent, or Firm*—Gibb I.P. Law Firm, LLC; Louis J. Percello, Esq.

(57) ABSTRACT

A method monitors non-faulty application traces of a computer application with the runtime environment during fault-free activities to create non-faulty runtime signatures for the computer application. Once obtained, the method stores the non-faulty runtime signatures. The method then detects a faulty application trace of the computer application and compares the faulty application trace with the non-faulty runtime signatures by comparing a call graph of the faulty application trace with call graphs of non-faulty application traces of the application signatures to identify differences between the two (e.g., fault attributes). Then the invention outputs the fault attributes to allow the user to identify a fault cause.

20 Claims, 14 Drawing Sheets

```
1:  prev_node = NULL
2:  for each system call in the flat sequence do
3:    if the graph is empty
4:      cyrr_node = NULL
5:    else
6:      search the nodes pointed by edges sarting on prev_node using context
7:      set curr_node as the node having the same context or NULL
8:    endif
9:    if curr_node = NULL
10:     add a new node (referred as curr_node)
11:     populate system call attributes in curr_node
12:     add an edge from prev_node to curr_node
13:   else
14:     update system call attributes in curr_node
15:     add an edge from prev_node to curr_node
16:   endif
17:   prev_node = curr_node
18: end
```

```
1:  FUNCTION aggregate(trace_file, sub_bank)
2:    add trace_file into sub_bank;
3:    FOR each child process DO
4:      let trace_file_child be its trace file
5:      look for a child of sub_bank using the context
           of the child process (referred as sub_bank_child);
6:      IF such child does not exist
7:        create a new sub_bank (referred as sub_bank_child);
8:        make sub_bank_child a child of sub_bank;
9:      END IF
10:     aggregate(traace_file_child, sub_bank_child);
11:   END DO
12: END FUNCTION
13:
14: IF signature_bank is empty
15:   create a new sub_bank (referred as sub_bank_root);
16: END IF
17: trace_file_root = trace file of the main process;
18: sub_bank_root = root of the sub_bank tree;
19: aggregate(trace_file_root, sub_bank_root);
```

FIG. 9

[sigexp@sysprof "]$ classifier sigbank/Apache traces/Apache_problem1.trace
** Record_ID: 58    Node_ID: 58    Graph_ID: 6    System call: write
Fails to write file /m/logs/access_log.
Note: File too large.
** Signal SIGXFSZ received by process 8259, 8260, 8261, 8262, 8267, 8268, 8269, 8271
Signal appears only in faulty execution.
Note: application appends a file larger than maximum allowed size.

[sigexp@sysprof "]$ classifier sigbank/CVS traces/CVS_problem6.trace
Environment variable $CVSROOT has been changed to a new value "/home/cvs".
** Record_ID: 158    Node_ID: 95    Graph_ID: 1    System call: access
Faulty execution checks user permission of a file/directory "/home/cvs/CVSROOT".
System call fails.
Note: No such file or directory.

FIG. 14

[sigexp@sysprof "]$ classifier sigbank/postgresql traces/postgresql_problem10.trace
** Record_ID: 45287    Node_ID: 11    Graph_ID (SIGHUP: 3    System call: open
File /home/pgsql/db/pg_hba.conf has been changed since last run.

| | Apache problems | |
|---|---|---|
| Index | Symptom | Root cause |
| 1 | Intermittent failures of httpd processes | Log file size is getting too large, close to 2GB |
| 2 | Httpd cannot start | File system containing httpd log files is mounted as read-only |
| 3 | Httpd cannot start, because if is unable to load share libraries in correct version | Paths are re-ordered in $LD_LIBRARY_PATH. |
| 4 | Httpd crashes when the number of connections is large. | Httpd loaded by crond has more restrictive resource limit. |
| 5 | Web clients cannot access contents pointed by symbolic links | User removed the FollowSymLinks directive from httpd.conf |

| | CVS problems | |
|---|---|---|
| Index | Symptom | Root cause |
| 6 | User cannot check out a specified CVS module | $CVSROOT is pointing to a directory that is not a CVS repository |
| 7 | CVS client cannot connect to CVS server | A non-default ssh port number is specified in /etc/ssh/ssh_config |
| 8 | Accesses to CVS repository are denied | User is not added to CVS group |
| 9 | User cannot connect to CVS server with an error message "temporary failure in name resolution" | Network cable disconnected |

| | PostgreSQL problems | |
|---|---|---|
| Index | Symptom | Root cause |
| 10 | DBMS accepts only connections from local machine | Config file pg_hba.conf is mistakenly changed |
| 11 | Server cannot start | A stale postmaster.pid file is left undeleted after improperly shutting down the server |

AUTOMATIC SOFTWARE FAULT DIAGNOSIS BY EXPLOITING APPLICATION SIGNATURES

BACKGROUND

1. Field of the Invention

The embodiments of the invention generally relate to methods of automating runtime failure analysis for a computer application operating within a runtime environment.

2. Description of the Related Art

Application problem diagnosis in complex enterprise environments is a challenging problem, and contributes significantly to the growth in IT management costs. While application problems have a large number of possible causes, failures due to runtime interactions with the system environment (e.g., configuration files, resource limitations, access permissions) are one of the most common categories. Troubleshooting these problems requires extensive experience and time, and is very difficult to automate.

More specifically, since the advent of the notion of "total cost of ownership" in the 1980s, the fact that IT operation and management costs far outstrip infrastructure costs has been well-documented. The continuing increase in IT management costs is driven to a large extent by the growing complexity of applications and the underlying infrastructure (J.-P. Garbani, S. Yates, and S. Bernhardt, The Evolution of Infrastructure Management, Forrester Research, Inc., October 2005). A significant portion of labor in these complex enterprise IT environments is spent on diagnosing and solving problems.

While IT problems that impact business activities arise in all parts of the environment, those that involve applications are particularly challenging and time-consuming. In addition, they account for the majority of reported problems in many environments and across a variety of platforms (H. Huang, R. Jennings, Y. Ruan, R. Sahoo, S. Sahu, and A. Shaikh, PDA: A Tool for Automated Problem Determination, In Large Installation System Administration Conference (LISA 2007), Dallas, Tex., December 2007).

Many factors can cause incorrect application behavior, including, for example, hardware or communication failures, software bugs, faulty application configurations, resource limitations, incorrect access controls, or misconfigured platform parameters. Although some of these are internal to applications, i.e., bugs, failures are more commonly caused when an application interacts with its runtime environment and encounters misconfigurations or other types of problems in the system (.H. J. Wang, J. C. Platt, Y. Chen, R. Zhang, and Y. -M. Wang, Automatic Misconfiguration Troubleshooting With Peerpressure, In OSDI'04: Proceedings of the 6th conference on Symposium on Operating Systems Design & Implementation, pages 17-17, Berkeley, Calif., USA, 2004, USENIX Association).

Troubleshooting these problems involves analysis of problem symptoms and associated error messages or codes, followed by examination of various aspects of the system that could be the cause. Application programmers can leverage signal handlers, exceptions, and other platform support to check for and manage system errors, but it is impossible to anticipate all such failures and create suitable error indications (J. Ha, C. J. Rossbach, J. V. Davis, I. Roy, H. E. Ramadan, D. E. Porter, D. L. Chen, and E. Witchel, Improved Error Reporting For Software That Uses Black-Box Components, In PLDI '07: Proceedings of the 2007 ACM SIGPLAN Conference On Programming Language Design And Implementation, pages 101-111, New York, N.Y., USA, 2007, ACM). As a result, solving these application problems requires a great deal of experience from support professionals and is often ad-hoc, hence it is very difficult to automate this process.

SUMMARY

Thus, presented below is a method of automating runtime failure analysis for a computer application operating within a runtime environment. More specifically, the method monitors non-faulty application traces of the computer application with the runtime environment during fault-free activities to create non-faulty runtime signatures for the computer application. The non-faulty application traces comprise interactions between the computer application and the runtime environment, and the non-faulty application traces are gathered during multiple runs of the computer application. Once obtained, the method stores the non-faulty runtime signatures.

The method then detects a faulty application trace of the computer application. The faulty application trace also comprises interactions between the computer application and the runtime environment. The method can then compare the faulty application trace with the non-faulty runtime signatures by comparing a call graph of the faulty application trace with call graphs of non-faulty application traces of the application signatures to identify differences between the two (e.g., fault attributes). Then, the invention outputs the fault attributes to allow the user to identify a fault cause. The signature also includes environment variables, application runtime command line options, user identification, call graph identification, etc., not just the system call graphs and their attributes.

To reduce the number of false positives, the method ranks the fault attributes based on a number of factors. For example, the methods herein can give more weight to fault attributes that are invariants (those that comprise fault attributes with a constant value) and can give more weight to fault attributes located closer to the head of the call graph of the faulty application trace. Similarly, the fault attributes can be ranked by assigning a higher weight to fault attributes found earlier relative to fault attributes found later.

The monitoring of the non-faulty application traces performed by the embodiments herein provides non-faulty attributes of the computer application. The method sorts such non-faulty attributes into groups of attributes, merges the groups of attributes to form the application signatures, and removes runtime variants from the application signatures. In addition, the monitoring of the non-faulty application traces performed by embodiments herein provide information regarding system calls, including system call number, parameters, return value and error number; signal numbers; environment names and values; resource limits; access control attributes including user and group identification values; and a call graph of system calls.

For example, when generating the call graph of system calls, the embodiments herein add a node to the call graph for each system call based on a system call memory context indicating from where within the computer application each system call was invoked. In addition, the embodiments herein add an arc from a parent node to each newly added node, and merge nodes of the same system call type having the same parent node.

The embodiments herein provide a black-box approach that can automatically diagnose several classes of application faults using applications' runtime behaviors. These behaviors along with various system states are combined to create signatures that serve as a baseline of normal behavior. When an application fails, the faulty behavior is analyzed against the signature to identify deviations from expected behavior and likely cause. The embodiments herein implement a diagnostic tool based on this approach and demonstrate its effectiveness in a number of case studies with realistic problems in widely-used applications.

This disclosure also includes results from a number of applications of the embodiments herein to show that the impact of the diagnostic tool on application performance (with some modifications of platform tracing facilities), as well as storage requirements for signatures, are both reasonably low.

BRIEF DESCRIPTION OF THE DRAWINGS

The embodiments of the invention will be better understood from the following detailed description with reference to the drawings, which are not necessarily drawing to scale and in which:

FIG. 6 is a schematic diagram illustrating an algorithm to convert a system call sequence to a system call graph;

FIG. 9 is a schematic diagram illustrating an algorithm to aggregate trace files into signature bank;

FIG. 14 is a schematic diagram illustrating command line and console output of classifier;

FIG. 15 is a schematic diagram illustrating command line and console output of classifier diagnosing PostgreSQL;

FIG. 18 is a table illustrating the problem symptoms and root causes for Apache, CVS, and PostgreSQL;

DETAILED DESCRIPTION

Figure 1:
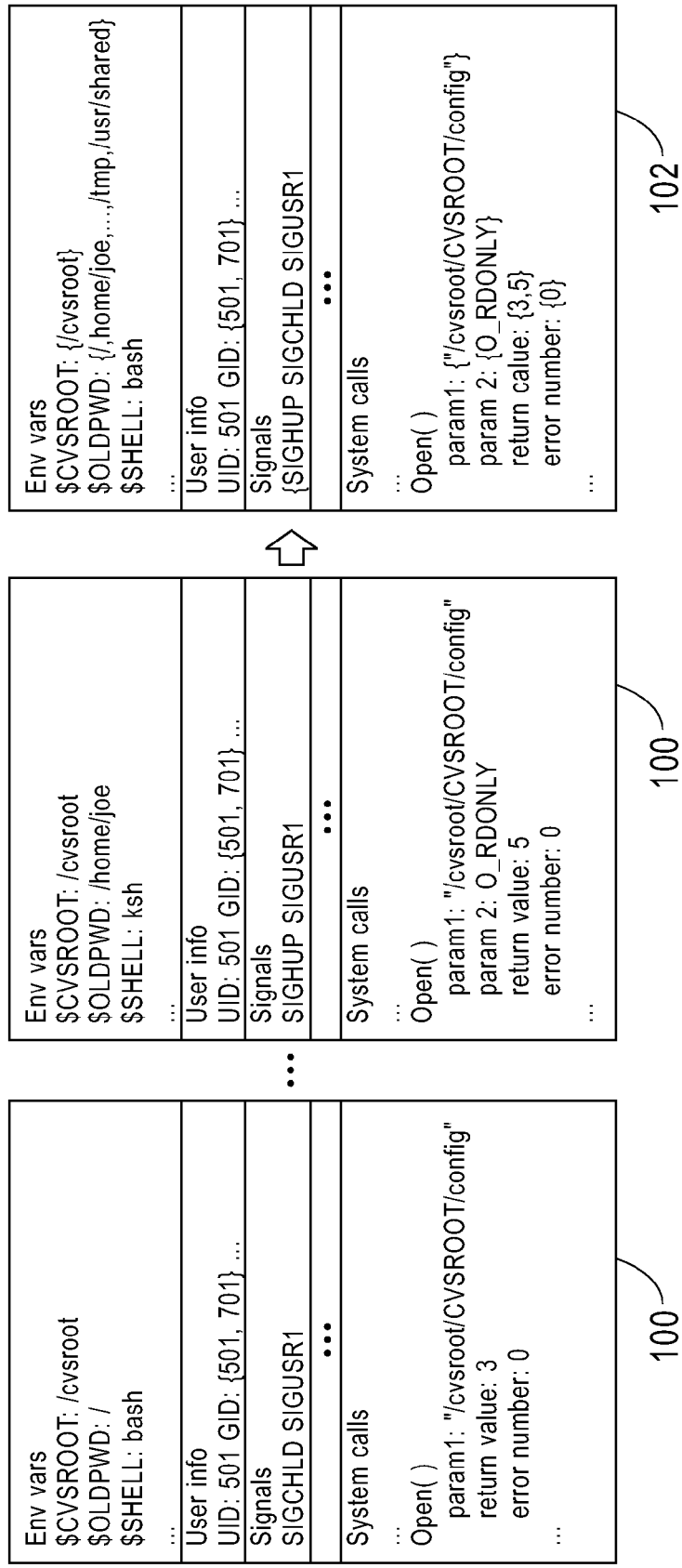
FIG. 1 is a schematic diagram illustrating how an application signature is built.

The embodiments of the invention and the various features and advantageous details thereof are explained more fully with reference to the non-limiting examples that are illustrated in the accompanying drawings and detailed in the following description.

1. Introduction

In this disclosure, the embodiments herein present a blackbox approach to automatically diagnose several types of application faults. The system creates a signature of normal application behaviors based on traces containing an extensive set of interactions between the application and the runtime environment gathered during multiple runs (or for a sufficiently long run). When an application fault occurs, the embodiments herein compare the resultant trace with the signature to characterize the deviation from normal behavior, and suggest possible root causes for the abnormal operation. Using output from the analysis, a system administrator, or user can significantly reduce the search space for a solution to the problem, and in some cases pinpoint the root cause precisely.

The embodiments herein represent an application's runtime behaviors using a variety of information, including its invocation context (e.g., user id, command line options), interactions with the platform during execution (e.g., system calls, signals), and environment parameters (e.g., environment variables, ulimit settings, shared library versions). The approach makes extensive use of the ptrace facility (M. Haardt and M. Coleman. ptrace(2), 1999) to collect system call and related information, and other interfaces to gather additional data. Traces containing such information are created during application runtime. After observing multiple runs of an application, information from these traces are summarized (into signatures) and stored in a signature bank. If the application outputs a fault indication, normal behavior of the application stored in the signature bank is compared with the faulty execution trace to find the root cause.

The embodiments herein evaluate the effectiveness of the tool using a series of real problems from three applications. The case studies show that the embodiments herein are able to accurately diagnose a number of diverse problems in these applications, and its accuracy can be improved as the embodiments herein observe more traces to increase the number (and diversity) of normal execution paths reflected in the application signatures. For each of the applications the embodiments herein also perform detailed evaluations of the time and space overhead of the approach, in terms of the application response time degradation due to trace collection, and the storage needed to store trace data and signatures. The initial results showed that the time overhead is very noticeable for the applications that were tested, up to 77% in the worst case using standard tracing facilities. However, with some modifications and optimizations, the embodiments herein can reduce this to less than 6%, which is a promising indication that the embodiments herein can be used in production environment. In terms of space, with embodiments herein, signatures grow to nearly 8 MB in some cases, which is quite manageable for modern storage systems. Moreover, the space dedicated to traces and signature data can be controlled according to desired trade-offs in terms of diagnosis accuracy or application importance.

2. Application Signatures

The approaches herein heavily rely on the ability to capture applications' various runtime behaviors (ingredients of a signature), and using such signatures to differentiate normal behaviors from abnormal ones. These runtime behaviors can be largely captured by recording how an application interacts with the external environment. In the following sections, the embodiments herein describe how to capture an application's runtime behaviors and how they can be used for building a signature, which can be more easily applied for diagnosing application problems than the raw runtime behaviors.

2.1 Capturing Application Behaviors

An application interacts with its external environment through multiple interfaces. A major channel is through system calls to request hardware resources and interact with local and remote applications and services. By collecting and keeping history information on system calls, such as call parameters and return values, runtime invariants and semi-invariants can be identified.

Invariants are attributes with a constant value, e.g., when an application calls open to read its configuration file, the name of the file, given as a parameter to the call, is almost never changed. Semi-invariants are attributes with a small number of possible values, e.g., the return value of the open call normally returns any small positive integer but does not have to be a fixed number.

Attributes that are invariant and semi-invariant are used to find the root cause of a problem, as this disclosure will illustrate later. Factors that have an impact on an application's behavior can be mostly captured via information collected from system calls. However, there are some factors that can influence an application's behavior without ever being explicitly used by the application (and therefore, cannot be captured by monitoring system calls.) For example, resource limits (ulimit), access permission settings (on executables and on users), some environment variables (e.g., LD PRELOAD), etc. cannot be observed in the system call context, but nevertheless, have important implications on applications' runtime behaviors. Additionally, asynchronous behaviors such as signal handling and multi-processing cannot be captured by monitoring system calls, and yet, they are intrinsic to an application's execution behavior. Therefore, to have a comprehensive view of an application's behavior, the embodiments herein collect the following information.

System call attributes: the embodiments herein collect system call number, call parameters, return value, and error number. On a number of system calls, the embodiments herein also collect additional information. For example, on an open call, the embodiments herein make an extra status call to get the metadata (e.g., last modified time and file size) of the opened file. Or, on a shmat (shared memory attach) call, the embodiments herein make an extra shmctl (shared memory control) call.

Signals: the embodiments herein collect the signal number and represent information collected during signal handling separately from the synchronous part of the application. This is discussed (along with how to handle multiprocess applications) in more detail later.

Environment variables: the embodiments herein collect the name and value of all the environment variables at the application startup time by parsing the corresponding environment file.

Resource limits: the embodiments herein collect ulimit settings and other kernel-set parameters (mostly in/proc) that might have impacts on applications.

Access control: the embodiments herein collect the UID (user identification) and GID (group identification) of the user and access permissions of the application executables. This is not meant to be a complete list, but from the experience working in the system administration field, the embodiments herein believes this is a reasonable starting point and the information that the embodiments herein collect here will be useful in diagnosing most problems. In the next section, this disclosure describes how the collected information is summarized to build a signature.

2.2 Building Application Signatures

The embodiments herein use a simple example in FIG. 1 to illustrate how signatures 102 are constructed from application's runtime behaviors 100. As shown in FIG. 1, these runtime behaviors 100 can be broken down into their elemental form as attributes, e.g., an environment variable is an attribute, UID is an attribute, and each of the parameters in a system call and its return value is an attribute. Distinct values that the embodiments herein have seen for an attribute are stored in a set structure, which is what this disclosure refers to as a signature 102 of that attribute. For example, the environment variable $SHELL in the example shown in FIG. 1 changes from "bash" to "ksh" between runs. Therefore, the signature of the $SHELL attribute is represented as a set {"bash", "ksh"}. On the other hand, the errno of the open call in the above example is always zero. Therefore, its signature is simply a set with one item {"0"}.

Some attributes always change across runs (i.e., normal runtime variants), e.g., PID, temporary file created using mkstemp, the return value of gettimeofday, etc. These are not useful attributes that the embodiments herein can leverage during problem diagnosis. The embodiments herein identify such non-useful runtime variants using, for example, the one-sample Kolmogorov-Smirnov statistical test (KS-test) (J. Frank J. Massey. The Kolmogorov-Smirnov Test for Goodness of Fit. (253):68-78, 1951). This provides a "test of goodness of fit" in statistics and is often used to determine if values in two datasets follow same distribution. The KS-test computes a distance, called D statistic, between the cumulative distribution functions of the values in two datasets. The KS-test provides a critical value $D_\alpha$ for a given significance level a, which represents the probability that the two datasets follow same distribution but KS-test determines they are not. If the D statistic is greater than D $\alpha$, the two datasets can be considered to have different distributions with the possibility of 1–$\alpha$. If an attribute is a runtime invariant (i.e., only one value in its signature), the embodiments herein do not perform a KS-test on it.

Figure 2:
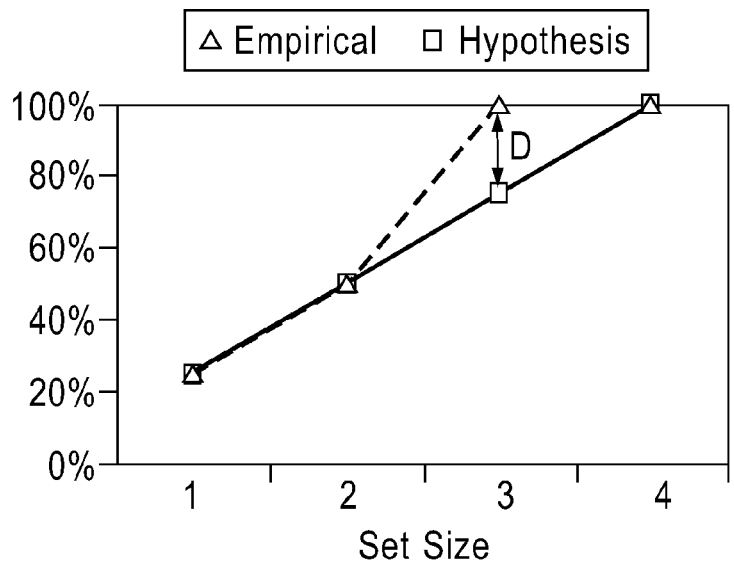
FIG. 2 is a schematic diagram illustrating KS-test.

The embodiments herein apply the KS-test to test only attributes with more than one distinct value. For such attributes, the embodiments herein monitor the changes in their signature size (i.e., the set size). Thus, the embodiments herein have a series of set sizes (as many as the collected values) for that attribute across runs. The embodiments herein then hypothesize that the attribute is a runtime variant, and its value changes in each run. This hypothesis will generate another series of set size, and the set contains all distinct values. The embodiments herein then use the KS-test to determine if the distributions of the set sizes in the two series are the same. If so, the attribute is considered to be a runtime variant. As an example, assume the embodiments herein have collected four values (and three are distinct) for an attribute. When the embodiments herein build the signature by merging these four values into a set one by one, the embodiments herein obtain four set sizes (1, 2, 3, 3)—the last two values are the same and did not increase the size of the set. If the attribute is a runtime variant, the embodiments herein expect the set sizes are (1, 2, 3, 4). The embodiments herein use the KS-test to compare the cumulative distribution functions of the set sizes as shown in FIG. 2. For this example, the D statistic is 0.25. If the embodiments herein set the significance level $\alpha$ to 10%, the critical value $D_\alpha$ of the KS-test is 0.564. As the D statistic is less than $D_\alpha$, the KS-test determines that the difference between the two distributions is not significant, thus, the embodiments herein consider this attribute as a runtime variant.

When an application fault arises, the embodiments herein compare the values of the attributes collected in the faulty execution against the values in their signature. Attributes that are considered as runtime variants are not used in comparison. If a value of an attribute cannot be found in its signature, the attribute is considered to be abnormal and is identified to be a possible root cause. With the signatures built in FIG. 1, if a process receives an extra signal SIGXFSZ in a faulty execution, which cannot be found in the signal signature, the signal can be identified to be abnormal. According to the semantics of the signal, only a process writing a file larger than the maximum allowed size receives this signal. Thus, one can find the root cause by checking the size of the files used by the application. Since each file accessed is monitored, the oversized file can be easily identified using the tool.

2.3 Building Signatures for System Calls

This disclosure shows the method of building signatures for attributes in the previous section. However, building signatures for attributes in system calls—e.g., parameters, return value, or error number—is not as simple. Before attributes in a system call can be built into signatures, the embodiments herein first find other invocations of this system call that are also invoked from the same location within the target application, either in the same run or in a previous run. However, this is a very difficult task when trying to find these correlated system calls among hundreds of thousands of system calls that are collected.

Figure 3:
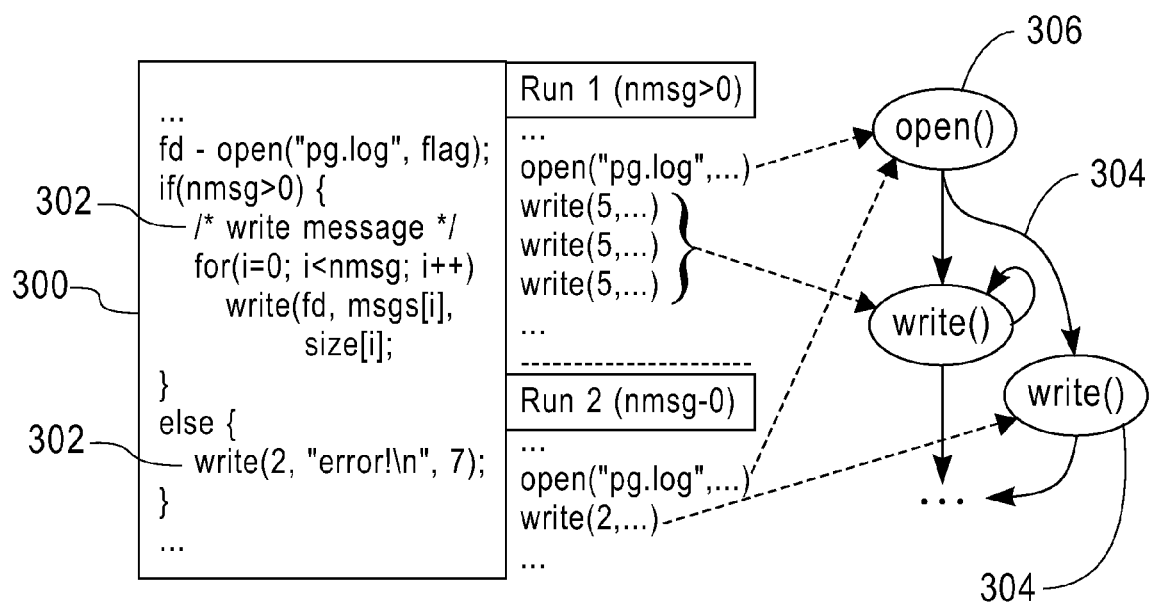
FIG. 3 is a schematic diagram illustrating a sample system call graph.

To understand the difficulty, this disclosure uses the example shown in FIG. 3. In the snippet of code 300, there are two write calls 302. Either one or the other will be invoked, depending on the value of nmsg, but not both. It makes no sense to merge the attributes of the first write call with those of the second write call when generating signatures, as these two write calls perform very different functions. The first is to write messages to a file, and the second is to print an error message to stderr. Therefore, attributes of the first write will only be merged with those of other invocations of the first write, i.e., within the for loop. One can imagine how difficult it would be to differentiate the first write call from the second when looking at a trace of a flat sequence of system calls as shown in FIG. 3.

Figure 4:
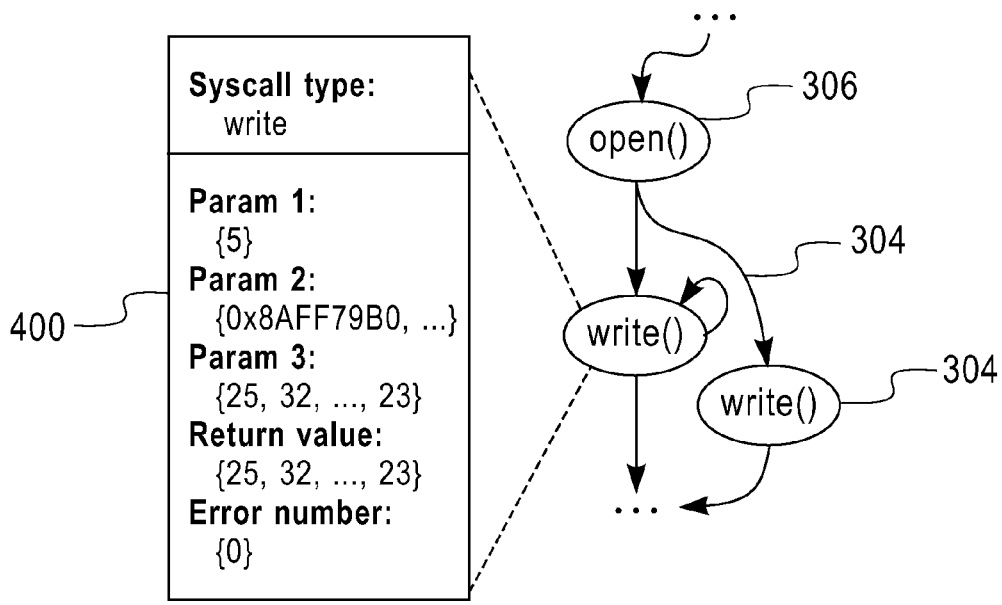
FIG. 4 is a schematic diagram illustrating an example system call graph.

The embodiments herein address this problem by converting a flat sequence of system calls to a graph representation, which this disclosure refers to as a "system call graph." Each node in the graph represents a unique system call in the target application, and the edges are unidirectional and represent the program execution flow from one system call to another. The right part of FIG. 3 shows such an example graph, where the two write calls 304 are clearly differentiated. As the embodiments herein can see, only those system calls invoked from the same place within the target application are collapsed into the same node, e.g., the open 306 from the two runs and the three invocations of the first write call in the for loop from the first run. Attributes 400 associated with each system call are appended to the node in the graph the system call corresponds to, as shown in FIG. 4.

One step in the construction of the system call graph is to collapse system call invocations that are invoked from the same location in the program to a single node in the graph, either within a single run or across multiple runs. Though the locations in an application can be represented by their virtual memory addresses, the embodiments herein use the stack of return addresses by collecting and analyzing the call stack information of the target process during each system call invocation. This gives system calls an invocation context in a more accurate way. The program shown in FIG. 5 illustrates this point.

Figure 5:
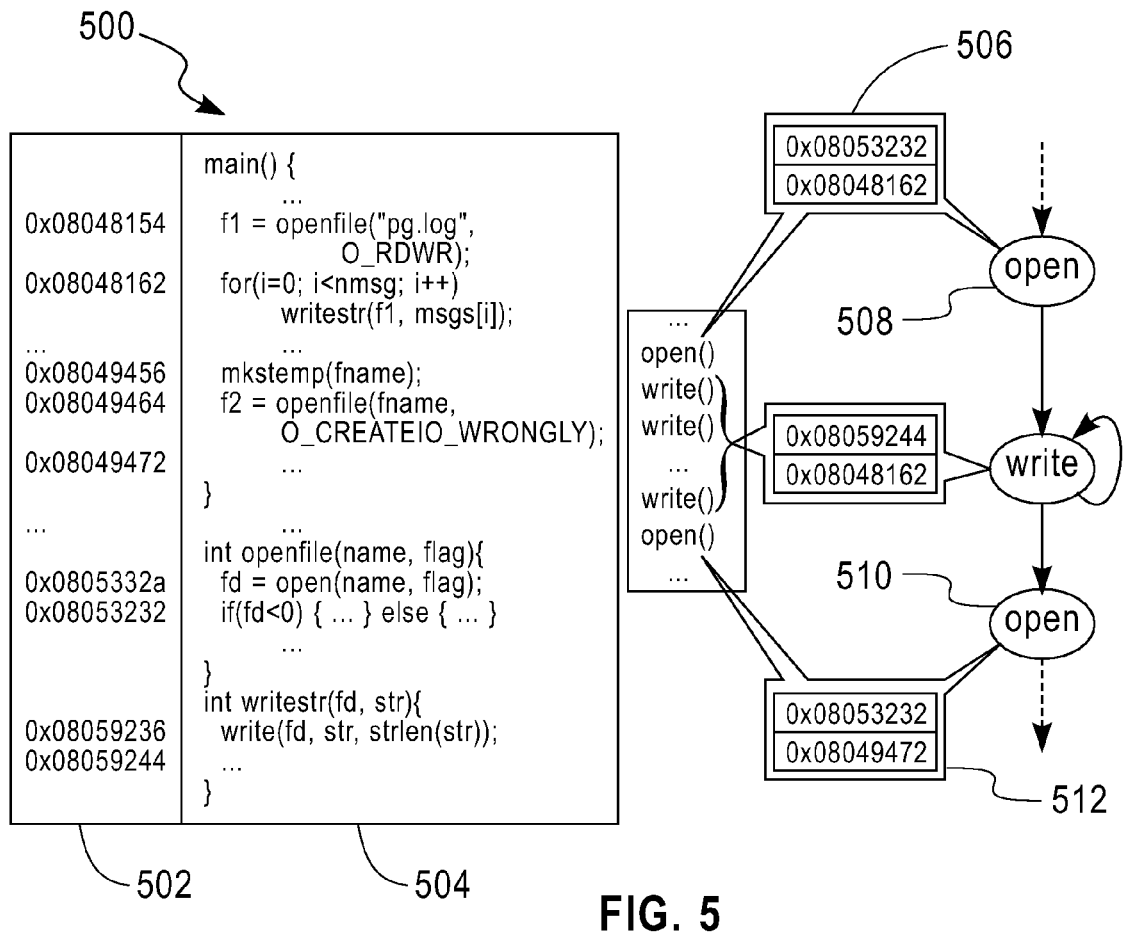
FIG. 5 is a schematic diagram illustrating building system call graph.

More specifically, in FIG. 5, for the statements 504 in the program 500, their memory addresses 502 are shown to their left. In the program 500, open and write system calls are wrapped in low level functions openfile and writestr. As these functions are used in different places in the program for different purposes, the system calls wrapped in them are also invoked for different purposes. Take function openfile as an example. It is used in two places in the program, 508 and 510. In one place, it is to open a log file, and in the other place, it is to open a temporary file. Thus, open is indirectly called two times for two different purposes. It is necessary to differentiate the open invocations for opening the log file and invocations for opening a temporary file because the names of temporary files are randomly generated and change across different runs. To clearly differentiate these two types of open invocations, the embodiments herein need not only the address where open is called, but also the addresses where openfile is called. This example illustrates that a "stack" 506, 512 of addresses of the functions in the calling hierarchy are needed to accurately differentiate the system call invocations.

This disclosure shows one exemplary method for collapsing a flat sequence of system call invocations to a system call graph in item 600 in FIG. 6. On line 6, the algorithm searches a matching node for a system call invocation following the edges in the system call graph. On line 14, when a node in the system call graph is found for the system call invocation, the attributes of the invocation, e.g., parameters, return values, and error numbers, are merged with existing attributes of the node. For each system call attribute, the embodiments herein again use a set to represent its distinct values among different invocations. This is illustrated in a write node 304 of FIG. 4.

Thus, the monitoring the non-faulty application traces performed by the embodiments herein provide non-faulty attributes of the computer application. The method sorts such non-faulty attributes into groups of attributes, merges the groups of attributes to form the application signatures, and removes runtime variants from the application signatures. In addition, the monitoring of the non-faulty application traces performed by embodiments herein provide information regarding system calls, including system call number, parameters, return value and error number; signal numbers; environment names and values; resource limits; access control attributes including user and group identification values; and a call graph of system calls.

For example, when generating the call graph of system calls, the embodiments herein add a node to the call graph for each system call based on a system call memory context indicating from where within the computer application each system call was invoked. In addition, the embodiments herein add an arc from a parent node to each newly added node, and merge nodes of the same system call type having the same parent node.

2.4 Dealing with Multiple Processes

Applications, especially server applications, may have multiple processes running concurrently. The embodiments herein collect data for each process separately for two reasons. The first reason is that the causal relations between system calls can only be correctly reflected after separating interleaving system calls. Both building system call graphs and diagnosis require to know correct causal relations between system calls. While building system call graphs needs the causal relations to form correct paths, diagnosis requires causal relations to trace back to system calls ahead of the anomalies to get more information. For example, if the embodiments herein identify that a write call is an anomaly, the embodiments herein desire to get the pathname of the file it changes by tracing back to an open call with the file descriptor. The second reason is that some attributes like signals, UIDs and GIDs are specific to a process. It is necessary to collect their values in a per-process mode to build accurate signatures for these attributes.

When the embodiments herein build signatures for a multi-process application, the embodiments herein divide its processes into groups based on the roles they play in the application, and build signatures separately for each process group. For example, a PostgreSQL server may create one or more back-end processes, one daemon process, and one background writer in each run. The embodiments herein build a system call graph and form a set of signatures for back-end processes, and the embodiments herein do the same for the daemon processes and background writers. When the embodiments herein build signatures for each process group, the embodiments herein treat the data collected for a process just like that collected in an execution of a single process application, and build signatures in a similar way. To identify which group a process belongs to, the embodiments herein use the stack information (return addresses) of the system call creating the process as a context of the process. Processes with same context are considered to be in the same group.

For multi-threaded applications, the embodiments herein collect data and build system call graphs and signatures for threads in the same way as the embodiments herein do for processes by treating each thread just like a process. While the embodiments herein can differentiate native threads through ptrace and /proc interfaces, which are managed by OS kernel, the embodiments herein cannot differentiate userlevel (green) threads, which are managed at user space and thus, transparent to OS kernel. As user-level threads have not been widely used, the current approach does not handle user-level threads.

The embodiments herein handle signal handler functions similarly to child processes, except that the embodiments herein collect only signal number and system call attributes for signal handler functions. When the embodiments herein build signatures for signal handlers, the embodiments herein use a 2-element tuple <process context, signal number> as the context of a signal handler. Thus, only data collected for signal handlers that handle same type signals for processes with same context are summarized to form signatures, e.g., the embodiments herein build a set of signatures for the SIGHUP signal handlers in the back-end processes of PostgreSQL.

3. Toolset Design and Implementation

In this section, this disclosure describes the architectural design and implementation of the diagnostic toolset for capturing applications' runtime behaviors, building signatures, and using which to find root cause of problems when they arise.

Figure 7:
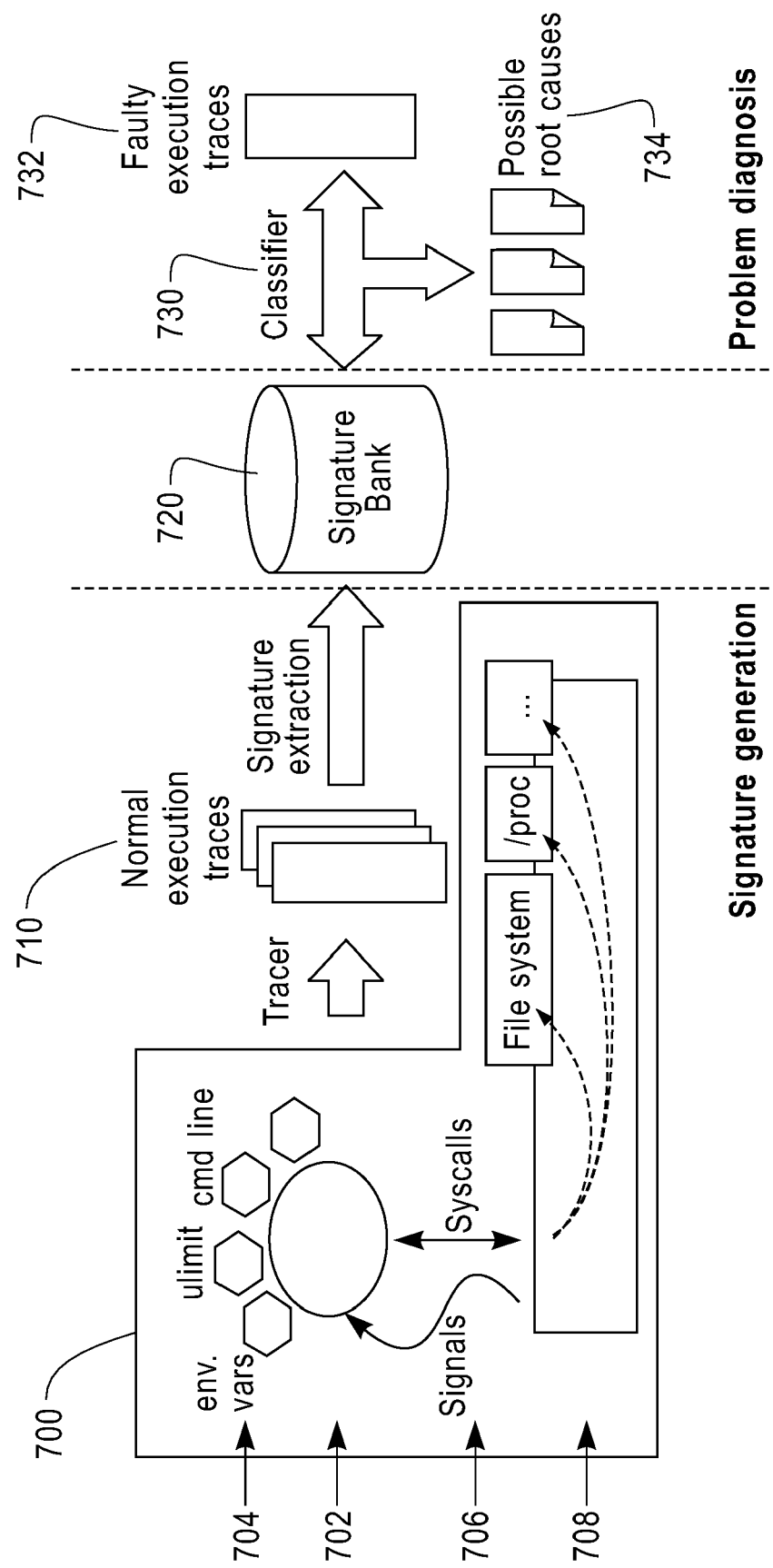
FIG. 7 is a schematic diagram illustrating system architecture.

FIG. 7 shows the overall architecture of the diagnostic toolset. First, a tracer tool 700 (Section 3.1) is used to monitor the runtime behaviors of applications and record a log of these behaviors. Logging is started by having the tracer tool fork-execute the target application 702, e.g., 'tracer sample program'. However, the tracer tool can be used more seamlessly if the embodiments herein attach it to the shell process and have it monitor all of the child processes 704 created by the shell. Since this tool is intended to run alongside of applications at runtime, having low overheads is crucial. This disclosure shows a detailed study of time and space overheads in Section 4.

On each run of the target application, the tracer tool will record and summarize its runtime behavior into a trace file 710. Multiple traces are then aggregated into a signature bank 720, a central repository where the target application's runtime signatures are distilled and built. This disclosure gives an in-depth explanation of the steps involved in building runtime signatures in Section 3.2.

The last part of the toolset, called the classifier 730 (Section 3.3), is used when an application is producing faults. The classifier 730 is used for comparing the faulty execution trace 732 (collected by the tracer) with the application's signature bank and classifying what differing features of the faulty trace from those in the signature bank might be the root cause of the problem 734. It is possible that sometimes multiple differing features are found. Since there is usually only one root cause, others are false positives. In Section 4.5, this disclosure discusses how to reduce the number of reported false positives.

3.1 Application Tracer

The tracer tool 700 monitors an application's runtime behaviors via the ptrace interface, which is widely implemented on Linux and most UNIX variants. This approach has the benefit of not requiring instrumenting the target application or having access to its source code, and also does not need kernel modifications. Each time the target application invokes or finishes a system call or receives a signal 706, the application process is suspended and the tracer is notified of the event by the kernel 708 and collects related information, e.g., call number, parameters, and return value. For a small set of system calls, the embodiments herein also collect some additional information that might be useful during problem diagnosis. This information is collected usually by having the tracer make extra system calls. For example, when open is called on a file, the embodiments herein make an extra stat call on the opened file to get its last modified time, which will become a part of the information the embodiments herein collect for that open call. In addition to files, the embodiments herein also collect additional information for other system objects such as shared memory, semaphore, sockets, etc. As explained in Section 2.3, to construct a system call graph from a sequence of system calls, the tracer also takes a snapshot of the call stack of the target application in the context of each system call.

As mentioned in Section 2.1, not all runtime behaviors can be captured by monitoring system calls, e.g., environment variables, ulimit, uid/gid of the user, etc. This information is collectively obtained by the tracer at the startup time of the target application, and it may be updated by monitoring system calls such as setrlimit, setuid, etc. at runtime.

For a single-process application, tracer puts all the monitored data into a single trace file. The trace file is logically separately into multiple sections to hold different categories of runtime data, similarly to that shown in FIG. 1. The largest section by far is usually the system call section. To reduce space overhead, instead of saving a flat sequence of system calls, the embodiments herein convert it into a system call graph on-the-fly using, for example, the algorithm shown in FIG. 6. The conversion removes much redundant information by collapsing multiple system calls invoked in a loop into the same system call graph node. To reduce I/O overhead, the system call graph is kept in the tracer's memory space via memory mapping of the trace file.

For a multi-process application, the embodiments herein keep one trace file per process (by detecting fork/exec) so the embodiments herein can separate the interleaving system calls made by different processes and maintain process-specific state information in each trace file. Ancestry relationships between processes are also kept in the trace file so the embodiments herein know exactly how the trace files are related and also at which point in the parent process the child process is spawned. Signal handlers are handled the same way by the tracer, as ptrace can also trap signals.

If a long-running application has large variations in its execution, its trace files may be filled with large volumes of data collected for runtime variants. By not saving these data into traces, the embodiments herein can reduce space overhead without influencing diagnosis. For an attribute having been considered as a runtime variant, this disclosure set an upper limit on the size of the set holding its distinct values. Thus, new values of a runtime variant are not collected into traces or merged into signature bank when the set size reaches the upper limit. The upper limit is chosen so it is sufficient to cover semi-invariants with large number of distinct values, yet small enough for it not to be a storage burden.

3.2 Signature Bank

Figure 8:
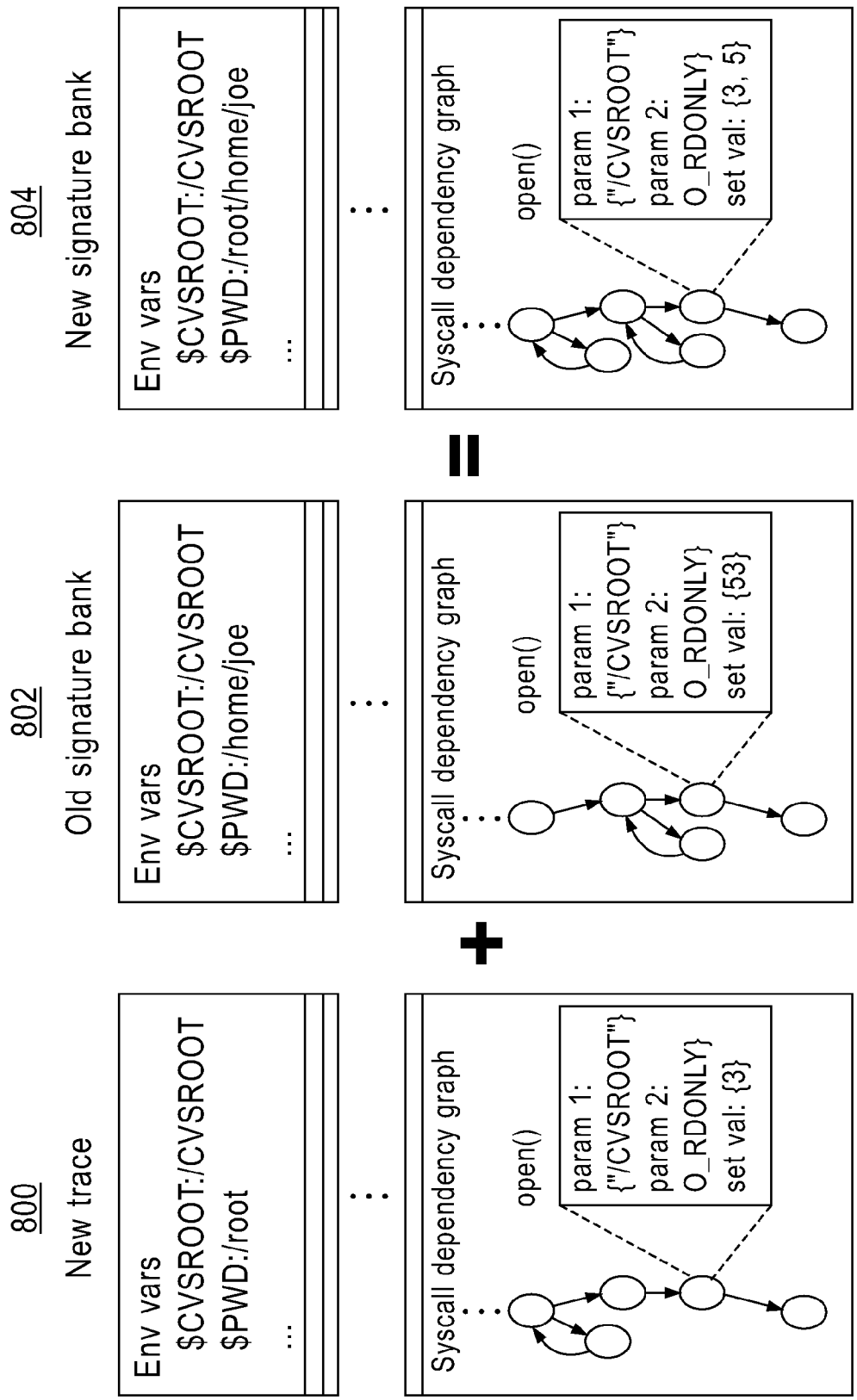
FIG. 8 is a schematic diagram illustrating a trace file merged with signature bank.

For single-process applications, a signature bank is simply an agglomerate of one or more normal execution trace files. When adding the first trace file to an empty signature bank, the trace file simply becomes the signature bank. As illustrated in FIG. 8, when adding new trace files 800 to the signature bank 802, values of attributes (e.g., an environment variable) in theses traces are compared to those in the signature bank. If the value of an attribute in the new trace is different from that of the signature bank, the new value is added to the set of possible values of that attribute in the signature bank 804. Otherwise, the signature bank remains unchanged. Since most attributes do not change between runs, the size of a signature bank grows very slowly over time. When merging the system call graph in a trace file into the signature bank, the embodiments herein use a similar algorithm as that illustrated in FIG. 6.

All attribute values and system call graph paths are versioned in the signature bank. This is useful when a faulty execution trace is inadvertently added to the signature bank. Versioning allows this action to be easily reverted.

For a multi-process application, its signature bank may include multiple sub-banks, each of which describes a separate process group. These sub-banks are organized to reflect the ancestry relationships between the processes they are associated with. Merging of the trace files of a multi-process application into the sub-banks is performed following any appropriate method, such as the method shown in FIG. 9.

The embodiments herein can also re-build application signatures after some administrative changes. For example, updating the application or the shared libraries changes the return addresses of the functions which invoke system calls directly or indirectly. Because these addresses are used as context to build system call graphs and to match system call invocations, system call graphs and signatures built before an update cannot be used any more after the update because the embodiments herein cannot find the signatures correctly with the return addresses in a new context.

3.3 Fault Diagnosis

When an application fault occurs, a classifier tool is used to compare the faulty execution trace with the application's signature bank. A fault can identified by the computer application outputting one of many different fault codes, by the computer program's failure to run to completion, by the computer program's output of erroneous data, by the computer program's running to long, etc., or can be manually identified by the user.

The comparison is straightforward. Application and system states in the faulty execution trace are first compared with those in the signature bank. Mismatched attributes are then identified. The system call graph in the faulty execution is next compared with that in the signature bank, one node at a time. For each node, its attributes are compared with those on the corresponding node within the signature bank. The embodiments herein do not list all the mismatched attributes as potential root causes, this might result in too many false positives.

To highlight the more likely root causes to the person diagnosing the problem, the classifier ranks the results. If an attribute from the faulty execution mismatches a signature that is either an invariant or has a very small cardinality, it is more like to be the root cause than if the signature were to a higher cardinality value. A high cardinality attribute is one that can take on many different possible values, whereas a low cardinality attribute is one that is either a constant or can take on only a few possible values. Additionally, among the mismatched attributes found in the system call graph, the embodiments herein give more weight to those attributes located closer to the "head" of the graph. The head of a graph is usually the topmost node in the graphs. The reason being, due to causal relationship, the mismatched attributes that are closer to the top of the call graph are likely to be the cause of the mismatches found toward the bottom.

4. Case Studies

In this section, this disclosure demonstrates the operation of embodiments herein using real world applications. This shows how effectively and accurately the tool is able to handle problems.

4.1 Experimental Methodology

The following sections cover three popular applications: Apache web server (The Apache Group. The apache HTTP server project. URL: http://httpd.apache.org/), CVS version control system (D. R. Price. CVS: Concurrent Versions System, 2006. URL: http://www.nongnu.org/cvs/) and PostgreSQL DBMS server (PostgreSQL Global Development Group. PostgreSQL: The World's Most Advanced Open Source Database. URL: http://www.postgresql.org/). Rather than injecting contrived faults to demonstrate the embodiments herein, this section of the disclosure evaluates actual problems faced by users of these applications, drawn from problem reports on Internet forums and from bug reporting tools such as Bugzilla. The target problems include configuration files, environment variables, resource limitations, user identities, and log files. This portion of the disclosure describes a subset of the demonstrations in this section, with the representative problems shown in Table 1.

For each demonstration, the general approach was to first collect traces by running the embodiments herein with a series of standard operations or workloads that represent its normal usage and operation. In some cases, the examples herein also change some system settings to emulate administrators tuning the system or modifying configurations. For example, when collecting traces for CVS, the examples herein perform the commonly used CVS operations such as import, add, commit, checkout, etc., multiple times on different modules in both local and remote CVS repositories. The CVS repositories are changed by resetting shell environment variable $CVSROOT. The embodiments herein integrate these normal operation traces into the signature bank to generate the runtime signatures of the application. After these two steps, the examples herein inject the selected fault manually and collect the faulty execution trace for each problem scenario. Afterward, the system is returned to the non-faulty state. Finally, the examples herein use the classifier to identify possible root causes by comparing the faulty execution traces with the application's signatures.

In each case this disclosure discusses the ability of the classifier to effectively distinguish erroneous traces from normal signatures to aid in diagnosing the problem. In addition, since the applications being diagnosed (and their threads) are launched from the tracer tool, the performance impact as well as space overhead due to trace and signature storage are important measures of the feasibility of the diagnosis approach. Therefore, for each application the examples herein estimates overhead in execution time or response time slow down by repeating the execution without tracer. The examples herein also record the size of the individual traces and the signature bank. Trace file size is less important than the size of the signature bank since trace files can be deleted after they are inserted into the signature bank. However, if the size of trace files is reasonably small, the embodiments herein can retain several recent traces and batch the aggregation operation to amortize the cost of insertion into the signature bank.

4.2 Apache

For tests with Apache, the embodiments herein use software to emulate multiple clients which concurrently access web pages through Apache. Besides generating workloads, the embodiments herein also use software to measure the average response time of Apache. This example repeats the following operations ten times to generate ten corresponding traces of Apache server: start the server with tracer, run software on another machine for 45 minutes generating HTTP requests, and stop the server.

Figures 10, 11:
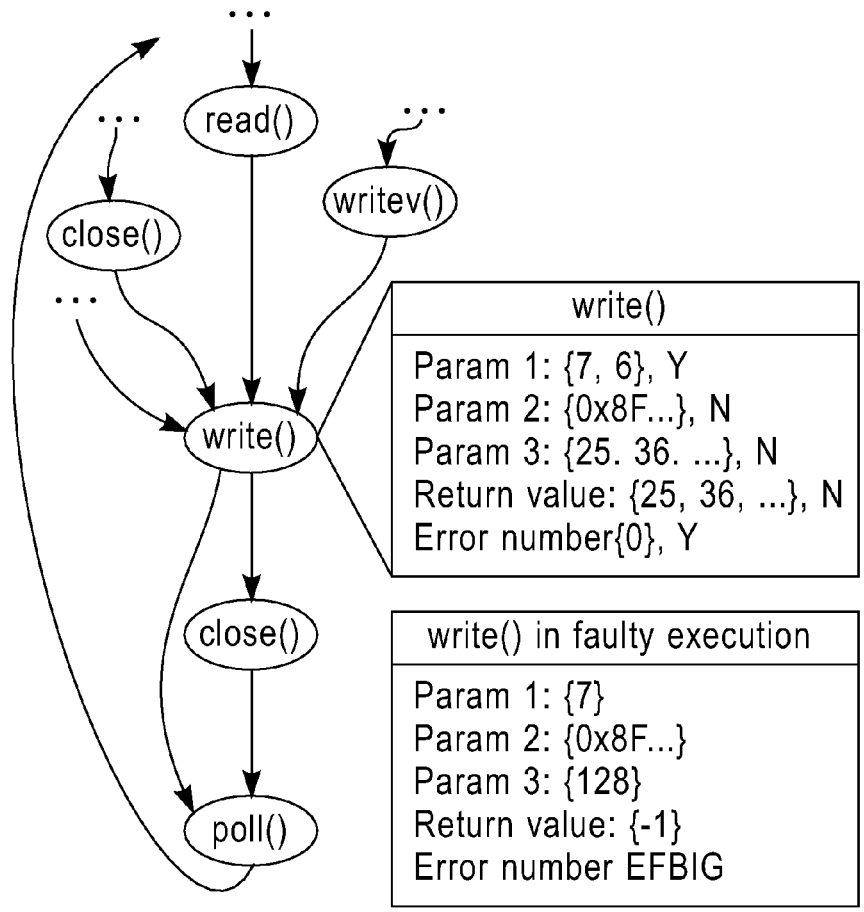
FIG. 10 is a schematic diagram illustrating signatures of the attributes in a write system call and the values of these attributes.
FIG. 11 is a schematic diagram illustrating command line and console output of classifier.

The embodiments herein use the signature bank built from the traces to diagnose the Apache problems listed in FIG. 18. Both problems 1 and problem 2 are related to log files. Because the contents and the sizes of log files usually change frequently, problems related to log files are difficult to diagnose by directly comparing persistent states without capturing the run-time interactions of the application. The classifier identifies the root causes by finding out abnormal system calls in the faulty execution traces, write for problem 1 and open for problem 2. The abnormally behaved system calls are identified because their error numbers do not match their signatures captured in the signature bank. FIG. 10 illustrates the difference between the values of these attributes in the faulty execution and their signatures in signature bank for problem 1. In problem 1, system call write in faulty execution cannot write access logs into log file access_log successfully. The root cause is revealed from its error number (EFBIG, which means file is too large). Similarly, in problem 2, system call open in faulty execution cannot open file error_log successfully. The root cause is revealed from the return value (−1, which means the system call fails) and its error number (EROFS, which means read-only filesystem). In addition to abnormally behaved system calls, the classifier also identifies that some httpd processes receive SIGXFSZ signals in the faulty execution in problem 1. The SIGXFSZ signal is only thrown by the kernel when a file grows larger than the maximum allowed size.

FIG. 11 illustrates the command used and the output of the tool in diagnosing problem 1. The classifier command usually has two parameters, the faulty execution trace ("traces/Apache_problem1.trace"), and the signature bank of Apache (stored in a file named "sigbank/Apache"). The messages under the command are console output of the classifier. The first line of the console output shows one of the possible root causes of this problem—the abnormal write system call invocation. Record_ID, Node_ID and Graph_ID indicate where the signatures are located in the signature bank so users can manually check the entire system call graph if necessary. The second and the third lines show how the system call invocation behaves abnormally. The remainder of the console output reports a second possible root cause, namely the new signals which don't appear in normal executions.

Problem 3 of Apache is caused by a modified environment variable. The classifier identifies the environment variable ($LD_LIBRARY_PATH) by comparing the value of the environment variable in the faulty execution trace against those in the signature. When Apache performs normally, paths in the environment variable are in the right order, and Apache can load correct libraries. Since this variable usually does not change in normal executions, the embodiments herein capture the value of $LD_LIBRARY_PATH as a signature in the signature bank. In the fault execution, paths in $LD_LIBRARY_PATH are reordered. As a result, when comparing the faulty execution trace against the signatures, the classifier finds the new value does not match the value in the signature bank and reports it as a possible root cause. Besides the changed environment variable, the classifier further identifies that the fault is caused by opening incorrect files in faulty execution because the pathnames of these files are different with those in the signatures. Based on the pathnames, administrators may identify these files are shared libraries.

Problem 4 is caused by a restricted resource limit setting on the maximum number of processes owned by the same user. The classifier diagnoses this problem by observing the abnormal return values and error numbers of the setuid system calls made by the httpd processes. The setuid system call increases the number of processes owned by the user which Apache runs as. The return values indicate that the system calls did not succeed, and error numbers indicate that the failure was caused by unavailable resources. In addition, since the embodiments herein keep resource limit as an attribute of the shell environment signature. The new resource limit value in the faulty execution differs with that in the signature, which is another indication of the root cause.

Problem 5 is caused by a change in a config file httpd.conf. In building application signatures, file metadata such as file size, last modification time are collected, usually when an open call happens. When comparing the faulty execution trace to the signatures, the classifier discovered that attributes of httpd.conf such as file size, last modification time etc. do not match those in the signatures. Thus, the classifier can attribute the application failure to the change in httpd.conf.

In these experiments, the response time of Apache observed by software is increased by 22.3% on average. The performance overheads are non-negligible. Thus, the embodiments herein provide a method to reduce performance overheads in Section 5.

Figure 12:
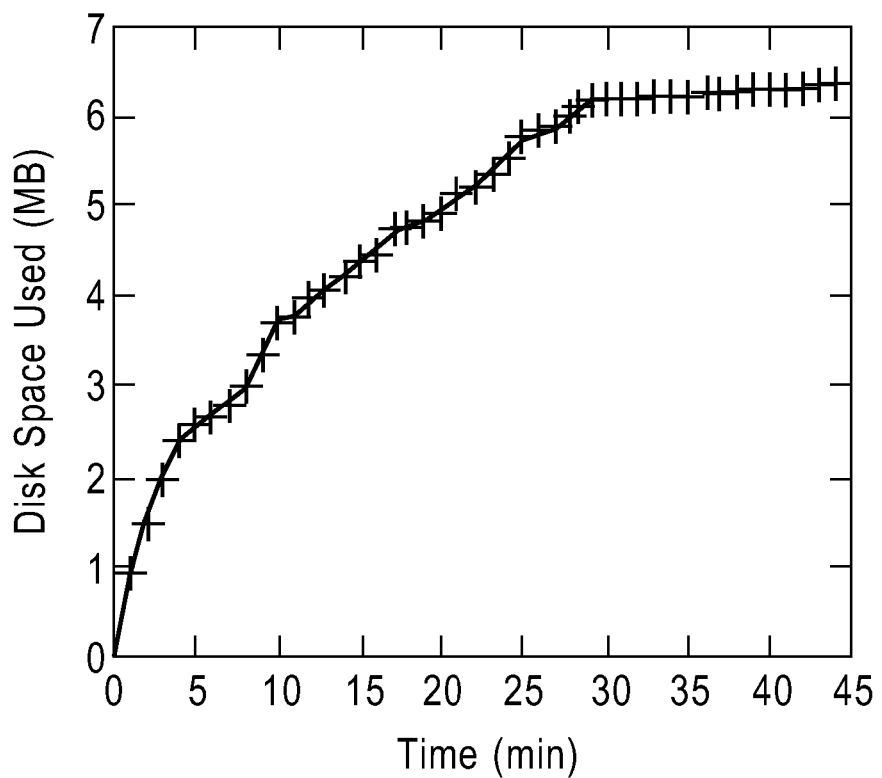
FIG. 12 is a schematic diagram illustrating the size change of an Apache trace.

FIG. 12 shows the change in size of an Apache trace in a 45 minutes period when Apache is serving requests. In the first a few minutes, the system call graphs are small and the value sets for the attributes do not include so many distinct values. The trace grows quickly as new system call graph nodes and new values are added into the trace. Afterward, the growth slows down with the system call graphs becoming more and more complete and the value sets covering more variations of the tributes. This trend is apparent especially after the $30^{th}$ minute due to redundancy across requests. At the end of the execution, the trace occupies 6.3 MB space, recording nearly 11 million system call invocations.

Figure 13:
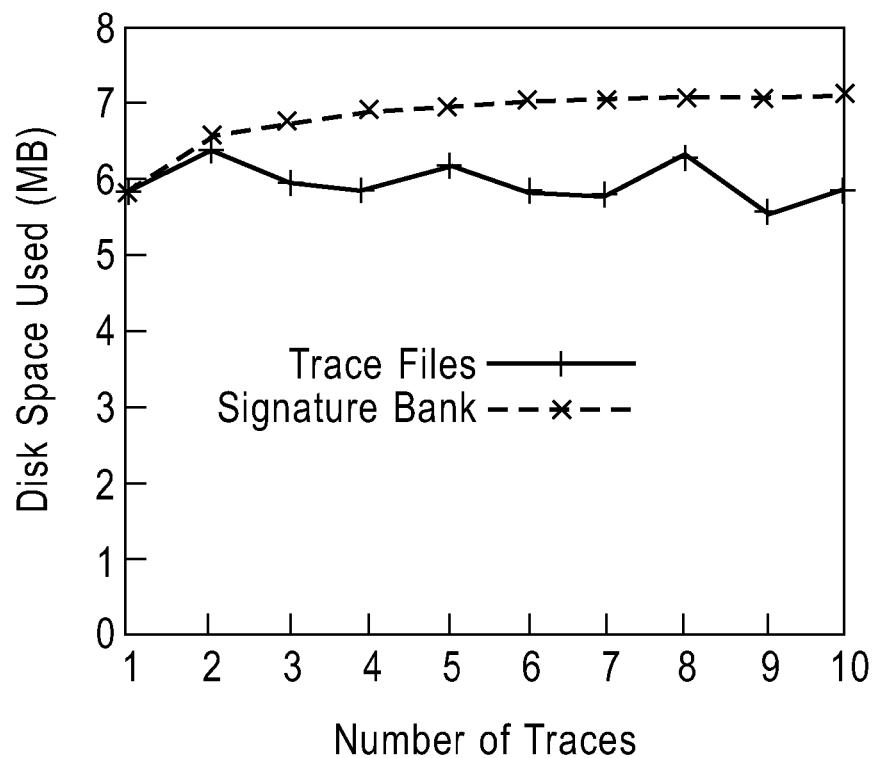
FIG. 13 is a schematic diagram illustrating sizes of traces and the signature bank for Apache.

FIG. 13 shows the size of the traces, and the change in the size of the signature bank after aggregating each of the traces. Though the size of each trace is around 6 MB, the size of the signature bank grows very slowly when a new trace is inserted because redundant data are merged.

4.3 CVS

As explained above, the embodiments herein collect traces of commonly used CVS operations on different modules including the source code of the diagnostic tools, strace, Gnuplot, and PostgreSQL in both local and remote CVS repositories.

Similar to problem 3, problem 6 is also caused by a modified environment variable. The symptom of problem 6 is that a user cannot check out a specified CVS module. FIG. 14 illustrates the command used and the console output of the tool. The first line of the console output shows one of the possible root causes of this problem—a new $CVSROOT's value has been used in the faulty execution. When CVS performs normally, the environment variable $CVSROOT has been changed several times and points to different repositories. These repositories include a local one at /home/cvs/ repository and several remote ones, from which the embodiments herein checked out the source code of strace, Gnuplot and PostgreSQL. Though this variable has been changed multiple times, the tool determines with a KS-test that this attribute is not a runtime variant, and uses its signature in diagnosis because the D-statistic of this variable is 0.42, which is far above the corresponding critical value $D\_=0.22$. In the faulty execution, $CVSROOT is changed to /home/cvs. As a result, the classifier finds the new value does not match the signature and reports it as a possible root cause.

The tool also discovers (2-4 line of the output in FIG. 14) an abnormal access system call invocation. The access system call is made by CVS to check the access permission of the CVSROOT directory. In normal executions, the "pathname" parameter is "/home/cvs/repository/CVSROOT", the return value is 0, and error number is 0. However, in the faulty execution, the access call has a different "pathname" parameter ("/home/cvs/CVSROOT") because $CVSROOT has been changed to /home/cvs. /home/cvs/CVSROOT is a nonexistent directory. Thus, the system call returns −1 and the error number is set to ENOENT accordingly. The classifier interprets the semantics of the return value and error number so users can understand easily. This simple example demonstrates how the tool helps to pinpoint the root cause of the problem and reveals detailed information for users to examine and verify, while the error message printed by CVS is simply "cannot find module 'strace'—ignored", which is not very descriptive and may be misleading.

Problem 7 is about a failed CVS server connection because of a non-default SSH port number in the configuration file. CVS usually makes connections with the remote CVS server via SSH using its default port number (number 22). In this scenario, the configuration file of the SSH client, /etc/ssh/ssh config, has been modified to use a customized port number. Therefore, all SSH client requests will use this customized number instead of the default port number. However, the SSH server on the CVS server is not changed accordingly to accept this new port. The tool identifies the config file to be one of the root causes in a similar way as in problem 5. When comparing the faulty execution trace to the signatures, the classifier discovers that the file was modified when the application is doing an open call, since the file size, last modification time etc. do not match. Beside the config file, the classifier also reports that a connect system call invocation is having a different port number as its parameter. This information indicates the cause might be a bad port number.

Problem 8 is one of the problems used to evaluate AutoBash (Y. -Y. Su, M. Attariyan, and J. Flinn. Autobash: Improving Configuration Management With Operating System Causality Analysis. In SOSP '07: Proceedings of Twenty First ACM SIGOPS Symposium On Operating Systems Principles, Pages 237-250, New York, N.Y., USA, 2007. ACM). This disclosure revisits this problem with the current approach. AutoBash solves this problem by looking for the causality between the group identifiers (gids) of the user and the access permissions of CVS repository. The approach builds a signature for gids used in CVS normal executions. In the signature bank, the signature of this attribute always takes one value since the CVS client always uses the CVS group. When comparing the faulty execution trace against the signatures, the classifier cannot find the gid of CVS group in the set of gids used by the faulty execution, thus, it classifies it as the root cause. Similar to problem 6 and problem 7, the classifier observes abnormally behaved system calls in faulty execution trace and prints out diagnosis messages of the errors.

From the problems disclosed herein, the only problem for which the classifier does not, in this limited example, provide completely accurate diagnosis is problem 9. The classifier observes the abnormal behavior of the poll system call recorded in the faulty execution trace and concludes that poll gets a timeout as the root cause. The classifier fails to identify the real root cause, because this limited example does not collect information about hardware states of the network card. Though the classifier cannot exactly locate the root cause, it discovers that the anomaly was caused by timeout on network communications. The information may be helpful because it can reduce the scope of investigation for the exact root cause.

While the tracer slows down CVS operations by different percentages, the embodiments herein observe an average slowdown of 29.6%. The smallest slowdown is less than 1%. It is observed when the embodiments herein check out Gnuplot from the remote repository gnuplot.cvs.sourceforge.net because network latencies dominate the delays. The greatest slow-down is 77.1%, which is observed when the embodiments herein commit a version of a small module to the local repository. The embodiments herein collect 26 traces for CVS in total. Their sizes range from 0.1 MB to 1.6 MB. They record about 1.8 millions system call invocations, and the largest trace file records over 219 thousands system call invocations. The size of the signature bank is 6.5 MB after these traces are aggregated.

4.4 PostgreSQL

For PostgreSQL, the embodiments herein collected 16 traces as it processed queries generated by the TPC-H (Transaction Processing Performance Council. TPC-H. URL: http://www.tpc.org/tpch/) benchmark for decision support systems. In PostgreSQL, access control configurations are specified in pg hba.conf. PostgreSQL loads this config file when it is started, and also does a reload when receiving a SIGHUP signal. Thus, with a reload command which sends PostgreSQL a SIGHUP signal, users may make the changes to pg hba.conf take effect immediately without restarting PostgreSQL. In evaluating problem 10, the embodiments herein injected faults by modifying pg hba.conf when PostgreSQL was running and let PostgreSQL reload pg hba.conf with the reload command. The embodiments herein run reload commands to let PostgreSQL load pg hba.conf in its signal handler, which this example has exercised in normal execution. The classifier identifies the root cause in a similar way as it did when diagnosing problem 5 and problem 7. The console output is shown in FIG. 15.

In problem 11, the shell script which loads PostgreSQL checks for the existence of the postmaster.pid file. If the file exists, it stops loading PostgreSQL, assuming it has been started already. In normal executions, an access system call is used to check for the existence of this postmaster.pid file, and usually returns −1 with the error number set to ENOENT. In faulty execution, the system call returns 0, indicating the existence of the file. The classifier discovers the root cause by comparing the error numbers and return values of the access call. The embodiments herein observed that, using the tracer, the queries are slowed down by 15.7% on average. Tracing causes less performance overhead for PostgreSQL than for the other two applications because most TPC-H queries are computation-intensive, and thus, PostgreSQL makes system calls infrequently. The traces are from 0.6 MB to 2.1 MB, and the signature bank is 3.2 MB after aggregating the traces.

4.5 Accuracy and Effectiveness

The embodiments herein identify root causes of problems by comparing a faulty execution with the application's normal runtime signatures. Having "good-quality" runtime signatures is useful for the identification of root causes. From the experience, identifying the root cause is usually not difficult using the approach, as the embodiments herein comprehensively capture the interactions between the application and the system states, whether or not they are persistent or non-persistent (the root causes of the above problems are all correctly identified using the tool). In addition to being able to identify root causes, it is also useful to limit the number of false positives. Having too many false positives will render the tool useless in practice.

Figure 16:
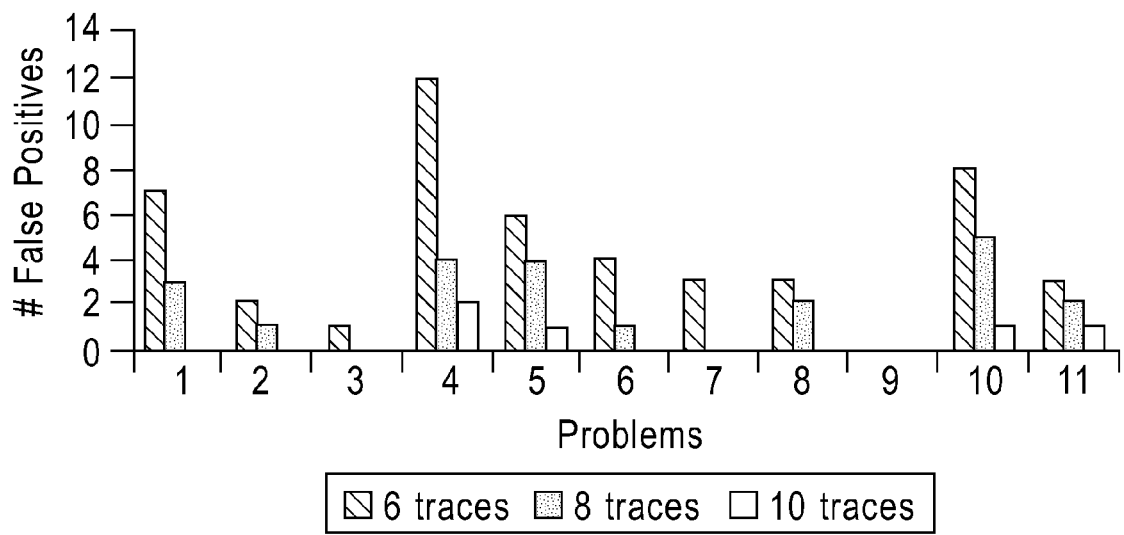
FIG. 16 is a table illustrating the number of false positives decreases.

False positives are generally caused by two reasons. One reason is related to the KS-test. Some normal runtime variants may not be ruled out during diagnosis if the significance level is set too high. A user may reduce false positives by decreasing the significance level. However, if the level is set too low, attributes useful for diagnosis may be mistakenly identified as runtime variants and thus, lead to false negatives. From the experience, setting the level to 10% works well for all the problems in the experiments (the numbers of false positives in diagnosing the problems are as shown in FIG. 16). Nevertheless, the embodiments herein enable the significance level to be set as a knob, in case users may adjust it in real-world environments to reduce false positives without causing false negatives. The other reason is that signature bank cannot cover all the possible normal variations of the attributes. For example, in problem 7, if the client has never connected to a CVS server before, the signature of $CVSROOT does not include the name of the new repository. Thus, the name of that new repository in $CVSROOT may be identified as one of the possible root causes false-positively. Aggregating more traces may make signature bank more "complete", and thus, is helpful in reducing such false positives. To illustrate this, for each problem, the embodiments herein also shows the number of false positives in FIG. 16 when the embodiments herein increase the number traces aggregated into the signature bank.

5. Optimization

The experiments in Section 4 show that the performance overheads of tracing are quite noticeable when using on real systems. In this section, the embodiments herein provide a technique of optimizing ptrace to significantly reduce these overheads.

Most of the performance degradation comes from information collection and trace file updating when a system call happens. To reduce the context switches and memory copies introduced by updating trace files, the embodiments herein use direct memory-mapping to map trace files into the memory space of the tracer. However, for each system call made by the traced application, the following overheads are still incurred. Four additional context switches, switching from kernel to tracer and back from tracer to kernel both at system call entry and exit. Time consumption is about 20.2 microseconds in total. Getting system call number, return value, error number, or each parameter would incur two additional context switches of 0.9 microseconds. Peeking into the user stack of the target application to get the content of its stack frames would require the OS to read the application's page table to resolve virtual addresses. Each of these operations takes about 2.0 microseconds.

Since most system calls usually take only a fraction of a microsecond, in the same time scale or even shorter than these activities, these overheads may significantly slow down the traced application. To reduce these overheads, the embodiments herein modify several ptrace primitives and added two primitives in Linux kernel. These improvements only require slight modifications to the current ptrace implementation. Less than 300 lines of new code are added. The new ptrace actions/primitives the embodiments herein added are: PTRACE SETBATCHSIZE: Set the number of system calls to batch before notifying the tracer; and PTRACE READBUFFER: Read and then remove data collected for the system calls in same batch from a reserved buffer space.

The improved ptrace interface reduces overheads by decreasing the number of ptrace system calls the tracer needs to call and the number of context switches. This is done by having the kernel reserve a small amount of buffer space for each traced process (40 KB in the current implementation) so it can be used by ptrace to store data it has collected on behalf of tracer without interrupting the traced application on every system call. Instead, the traced application is only interrupted when (i) the buffer space is approaching full, (ii) a user-defined batch size (of system calls) is reached, or (iii) a critical system call is made, e.g., fork, clone, and exit. By batching the collection of information on system calls, the costs of context switches and the additional ptrace system calls are dramatically reduced.

Figure 17:
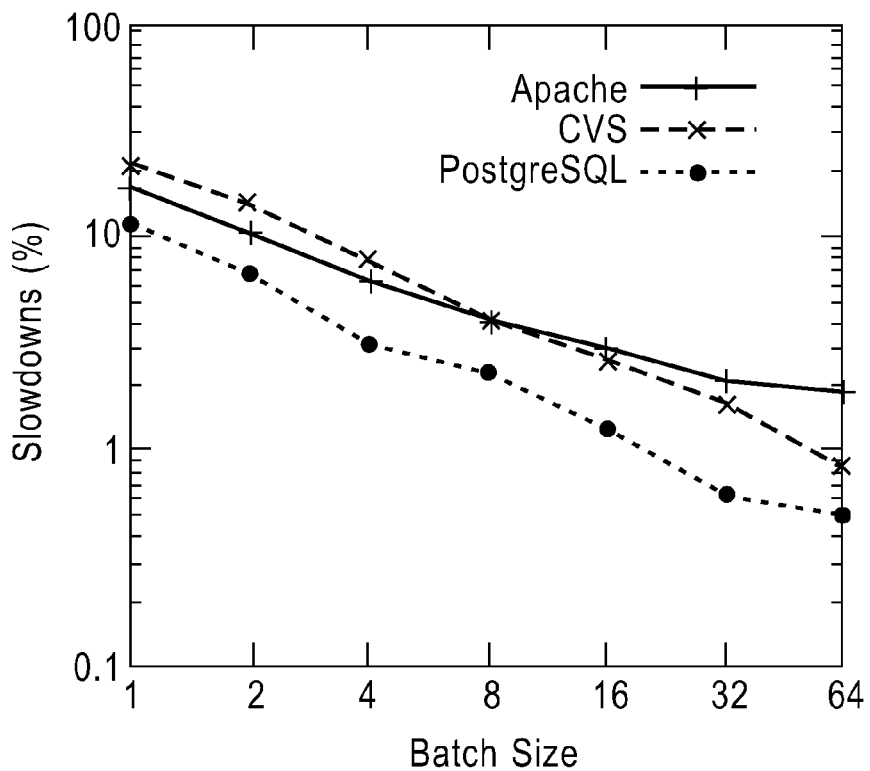
FIG. 17 is a schematic diagram illustrating slowdowns for Apache, CVS, and PostgreSQL.

This example repeats the trace collection operations for Apache, CVS, and PostgreSQL in Section 4 with the improvements introduced above. The slowdowns of these applications are shown in FIG. 17 with the batch size varying from 1 to 64.

Even when batch size is equal to 1, the applications have smaller slowdowns with improved ptrace than they do with original ptrace. There are two reason. One reason is that OS invokes tracer only once with improved ptrace for each system call on its exit, instead of twice with original ptrace on both system call entry and system call exit. The other reason is that the tracer needs only one improved ptrace system call (PTRACE READBUFFER primitive) to get the required data, instead of multiple ptrace system calls with original ptrace. With the increase in batch size, slowdowns are reduced significantly for all applications. When batch size is increased to 64, the slowdowns of Apache, CVS, and PostgreSQL with improved ptrace are reduced to 1.9%, 0.8%, and 0.5% respectively. For normal applications, such small slowdowns are acceptable.

6. Related Work

As systems are becoming more complex and problem diagnosis is taking longer and requiring more expertise, quite a few number of related works, that this disclosure describes in Section 6.1, have attempted to automate problem diagnosis and resolution. The general approach the embodiments herein take to automate problem diagnosis in this work, capturing and utilizing application's runtime behavior, has also been applied to other areas such as debugging and intrusion detection, which this disclosure covers in Section 6.2 and Section 6.3, respectively.

6.1 Problem Diagnosis and Resolution

A general approach to diagnosing and solving application problems, especially those caused by misconfiguration, is to regularly checkpoint system states and keeps track of state changes. For example, Strider (Y. -M. Wang, C. Verbowski, J. Dunagan, Y. Chen, H. J. Wang, C. Yuan, and Z. Zhang, Strider: A Black-Box, State-Based Approach to Change and Configuration Management and Support, In LISA '03: Proceedings Of The 17th USENIX Conference On System Administration, Pages 159-172, Berkeley, Calif., USA, 2003. USENIX Association) takes periodic snapshots of the Windows Registry. When a problem occurs, recently changed or new registry entries are presented as potential root causes. Chronus (A. Whitaker, R. S. Cox, and S. D. Gribble, Configuration Debugging As Search: Finding The Needle In The Haystack, In OSDI'04: Proceedings of The 6th Conference On Symposium On Operating Systems Design & Implementation, Pages 6-6, Berkeley, Calif., USA, 2004. USENIX Association) and FDR (C. Verbowski, E. Kiciman, A. Kumar, B. Daniels, S. Lu, J. Lee, Y. -M. Wang, and R. Roussev, Flight Data Recorder: Monitoring Persistent-State Interactions To Improve Systems Management. In OSDI '06: Proceedings of the 7th Symposium on Operating Systems Design and Implementation, pages 117-130, Berkeley, Calif., USA, 2006. USENIX Association) also takes into account of changes in other system states, not just in the Windows Registry. FDR actually records every event that changes the persistent state of a system. While such system-wide approach is generally fairly comprehensive when it comes to recording changes, filtering out noises (i.e., unrelated changes) and pin-pointing the exact root cause can sometimes be difficult. On the other hand, the approach the embodiments herein take is very application-specific. The embodiments herein only consider those changes that are known to have an impact on the application that the embodiments herein diagnose.

Yuan et al. (C. Yuan, N. Lao, J. -R. Wen, J. Li, Z. Zhang, Y. -M. Wang, and W. -Y. Ma, Automated Known Problem Diagnosis With Event Traces, In Euro Sys '06: Proceedings of the ACM SIGOPS/Euro Sys European Conference on Computer Systems 2006, pages 375-388, New York, N.Y., USA, 2006. ACM) is the most closely related work. They try to match the system call sequence of a faulty application with that of a set of known (Top 100) problems. When a match is made, the pre-cooked solution to that problem is presented to the user. One problem with this approach is that there is a huge number of different applications, and for each application, there are many possible problems. As a result, the 80-20 rule might not hold true here, which means building a knowledge base of only the Top 100 problems might not be sufficient. Additionally, there are a few problems with comparing only system call sequences, which the this disclosure discusses in Section 2. In this work, the embodiments herein address these problems by converting system call sequences to graph structures. PeerPressure (H. J. Wang, J. C. Platt, Y. Chen, R. Zhang, and Y. -M. Wang, Automatic Misconfiguration Troubleshooting With Peer Pressure, In OSDI'04: Proceedings of The 6th Conference On Symposium On Operating Systems Design & Implementation, pages 17-17, Berkeley, Calif., USA, 2004, USENIX Association) is closely related to the Strider work, also looking at the Windows Registry. It goes a step further and uses statistical methods to compare application-specific Windows Registry entries across many machines to detect abnormal entries. However, this work is limited to only Windows platform and problems caused by misconfiguration in the Windows Registry.

AutoBash (Y. -Y. Su, M. Attariyan, and J. Flinn, Autobash: Improving Configuration Management With Operating System Causality Analysis, In SOSP '07: Proceedings of Twenty First ACM SIGOPS Symposium On Operating Systems Principles, pages 237-250, New York, N.Y., USA, 2007, ACM, referred to herein as AutoBash) is a set of interactive tools to deal with misconfiguration problems. It uses OS-level speculative execution to track causal relationships between user actions and their effect on the application. Fundamentally different from other related works in this section and the current embodiments herein, AutoBash does not monitor historical changes in system and application states in order to find root cause. Instead, it relies on the user to have sufficient expertise in finding the root cause and records the actions taken, in case the same problem occurs again in the future. Users are also required to define predicates specifying the correct behavior of an application. These can sometimes be difficult and time consuming to define. In the present approach, the correct behavior of an application is already captured by its runtime signatures.

6.2 Debugging

Capturing and discovering program runtime invariants are important to programmers when debugging. Various tools are developed for this purpose. Daikon (M. D. Ernst, J. Cockrell, W. G. Griswold, and D. Notkin, Dynamically Discovering Likely Program Invariants To Support Program Evolution, IEEE Trans. Software Eng., 27(2):99-123, 2001) detects invariants based on the values of a set of tracked expression at various program points such as reading or writing a variable, procedure entries and exits. DIDUCE (S. Hangal and M. S. Lam, Tracking Down Software Bugs Using Automatic Anomaly Detection, In ICSE '02: Proceedings of the 24th International Conference on Software Engineering, pages 291-301, New York, N.Y., USA, 2002, ACM) hypothesizes invariants that a program obeys in its execution and gradually relaxes the hypothesis when it observes a violation. These tools usually instrument an application at a very fine granularity to track its "internal" problems. As a result, slowdown can be as much as a hundred times slower or more, which is still acceptable during debugging.

The tool focuses on diagnosing problems after an application has been released and works while the application is being used. Therefore, low overhead is the key for such tool to be pragmatic, which the embodiments herein have demonstrated in the evaluation of the tool. Furthermore, the embodiments herein do not require having application's source code and monitor the application using a black-box approach. This allows the tool to work also with commercial software which almost always does not have accompanying source code available.

6.3 Intrusion Detection

In security area, system calls are commonly traced to detect intrusions, where patterns detected in a system call sequence are most important, and other information, such as return value, parameters, and error code, are less so. Intrusion patterns are relatively easier to detect than that of a functional problem of an application, which can happen anywhere in the application and caused by almost anything. Therefore, for problem diagnosis, more detailed information and more types of information are needed to perform accurate diagnosis. And, at the same time, the embodiments herein need to incur as little overhead as possible; like intrusion detection systems, the tool is meant to run alongside of applications. David and Drew build non-deterministic pushdown automata for system calls made by applications (D. Wagner and D. Dean, Intrusion Detection Via Static Analysis, In SP '01: Proceedings of the 2001 IEEE Symposium on Security and Privacy, page 156, Washington, D.C., USA, 2001, IEEE Computer Society), which are very similar to system call graphs in the approach. However, they build the automata to have a complete coverage of all the possible execution paths to avoid false alarms. In this approach, the embodiments herein only need to have common execution paths in the signature bank to detect anomalies.

7. Conclusion

The embodiments herein provide an automatic approach to diagnose application faults. The approach finds problem root causes by capturing the run-time features of normal application execution in a signature and examining the faulty execution against the signature. This disclosure implements this approach in a user level tool and evaluates it using real application problems that demonstrate that the approach can accurately diagnose most of these problems. This disclosure tests both the space and time overheads of deploying the diagnosis tool, and though the impact on application response time is high, this disclosure has proposed and tested a method that significantly reduces it.

Figure 19:
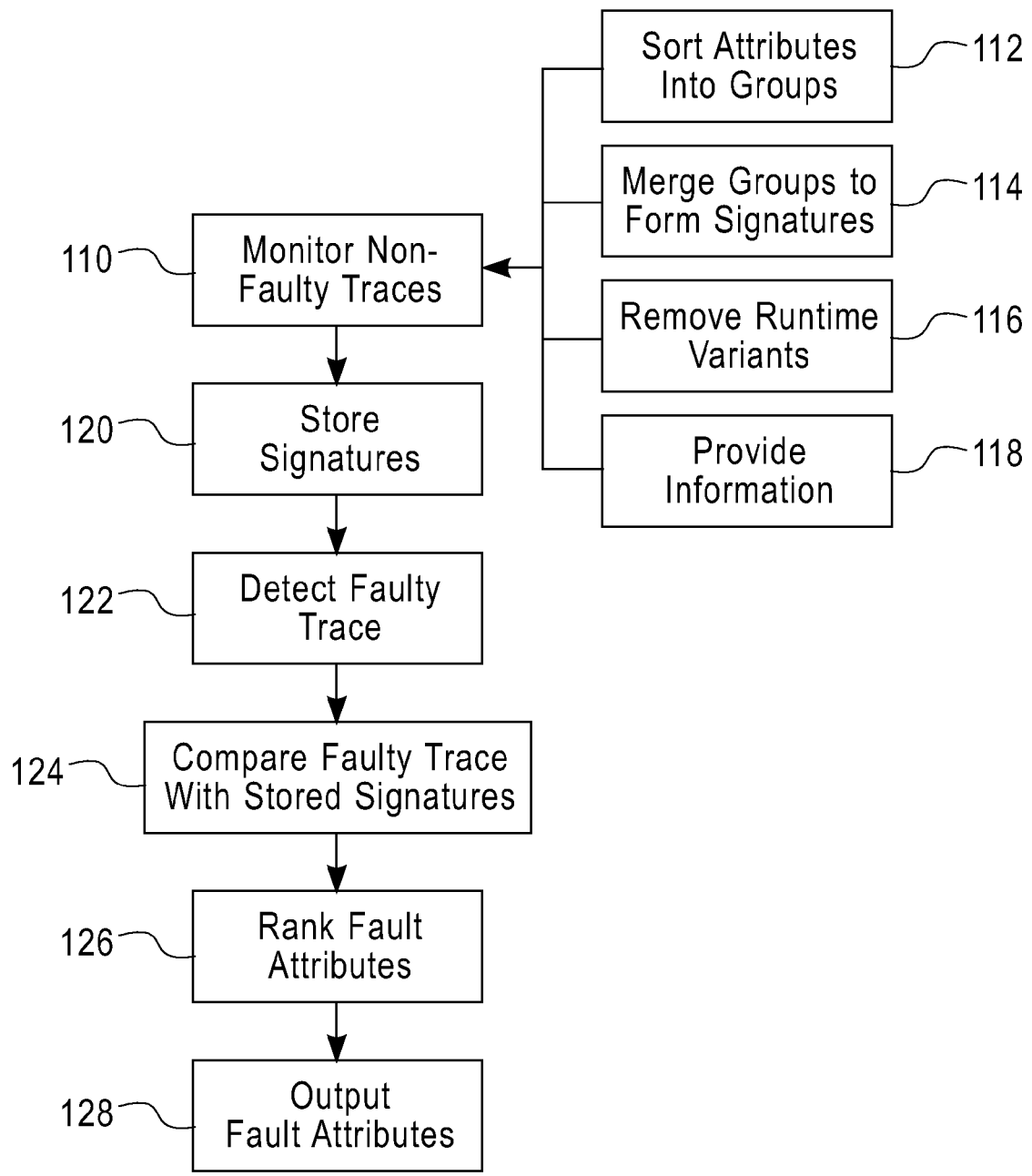
FIG. 19 is a flow chart illustrating an embodiment of the invention.

FIG. 19 is a flowchart illustrating the method embodiments discussed above and illustrates the method of automating runtime failure analysis for a computer application operating within a runtime environment that is discussed above. More specifically, the method monitors non-faulty application traces of the computer application with the runtime environment during fault-free activities to create non-faulty runtime signatures for the computer application in item 110. The non-faulty application traces comprise interactions between the computer application and the runtime environment, and the non-faulty application traces are gathered during multiple runs of the computer application.

The monitoring of the non-faulty application traces performed by the embodiments herein (110) provide non-faulty attributes of the computer application. The method sorts such non-faulty attributes into groups of attributes 112, merges the groups of attributes to form the application signatures 114, and removes runtime variants from the application signatures 116. In addition, the monitoring of the non-faulty application traces performed by embodiments herein provide information (118) regarding: system calls, including system call number, parameters, return value and error number; signal numbers; environment names and values; resource limits; access control attributes including user and group identification values; and a call graph of system calls.

For example, when generating the call graph of system calls, the embodiments herein add a node to the call graph for each system call based on a system call memory context indicating from where within the computer application each system call was invoked. In addition, the embodiments herein add an arc from a parent node to each newly added node, and merge nodes of the same system call type having the same parent node.

Once obtained, the method stores the non-faulty runtime signatures in item 120. The method then detects a faulty application trace of the computer application in item 122. The faulty application trace also comprises interactions between the computer application and the runtime environment. The method can then compare the faulty application trace with the non-faulty runtime signatures in item 124 by comparing the call graph of the faulty application trace with call graphs of non-faulty application traces of the application signatures to identify differences between the two (e.g., fault attributes).

To reduce the number of false positives, the method ranks the fault attributes based on a number of factors in item 126. For example, the methods herein can give more weight to fault attributes that are invariants (those that comprise fault attributes with a constant value) and can give more weight to fault attributes located closer to the head of the call graph of the faulty application trace. Similarly, the fault attributes can be ranked by assigning a higher weight to fault attributes found earlier relative to fault attributes found later. Then the invention outputs one or more of the highest ranking fault attributes to allow the user to identify a fault cause in item 128.

Thus, the embodiments herein provide a black-box approach that can automatically diagnose several classes of application faults using applications' runtime behaviors. These behaviors along with various system states are combined to create signatures that serve as a baseline of normal behavior. When an application fails, the faulty behavior is analyzed against the signature to identify deviations from expected behavior and likely cause. The embodiments herein implement a diagnostic tool based on this approach and demonstrate its effectiveness in a number of case studies with realistic problems in widely-used applications.

This disclosure also includes results from a number of applications of the embodiments herein to show that the impact of the diagnostic tool on application performance (with some modifications of platform tracing facilities), as well as storage requirements for signatures, are both reasonably low.

The embodiments of the invention can take the form of an entirely hardware embodiments herein, an entirely software embodiments herein or an embodiments herein including both hardware and software elements is the embodiments can be implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 20:
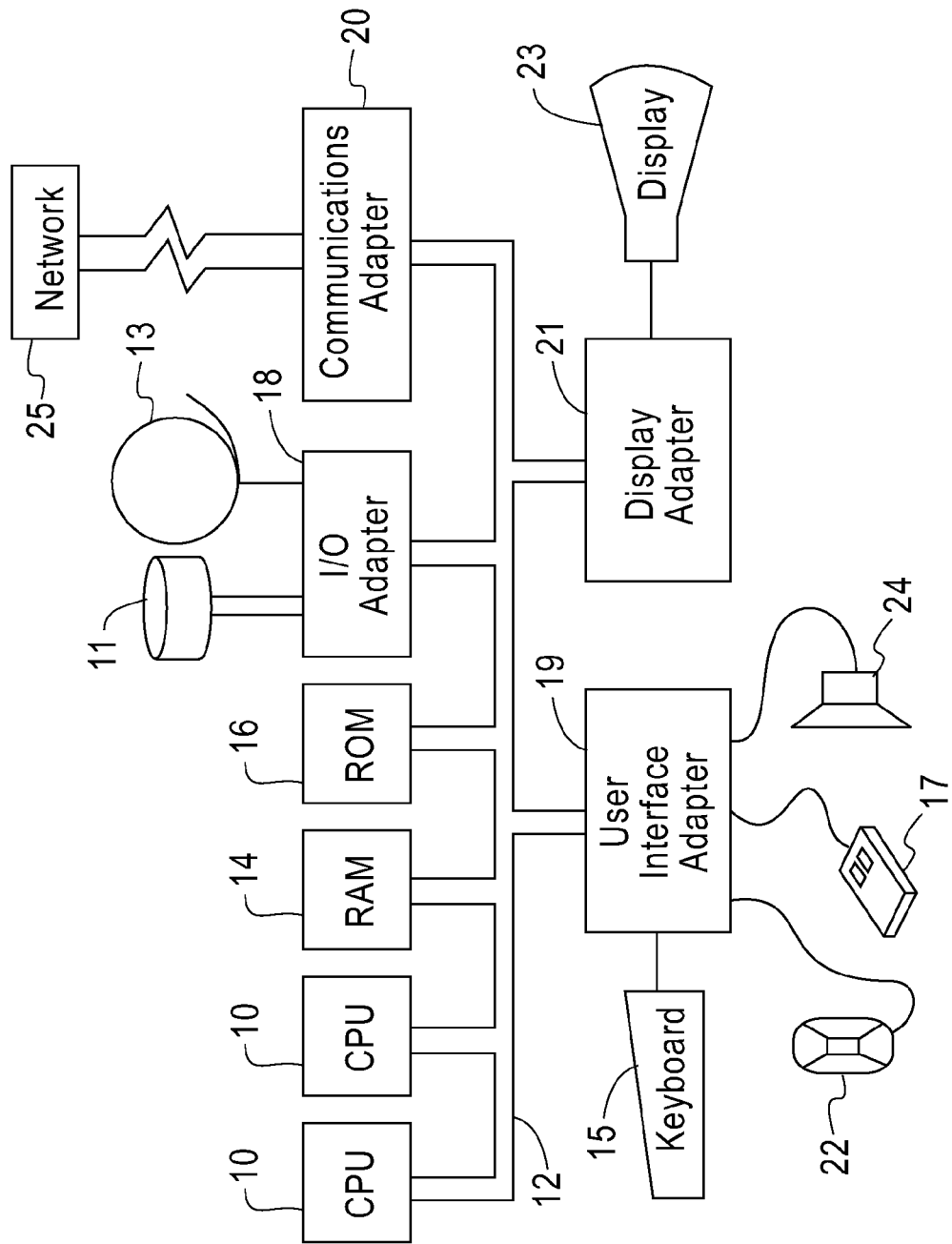
FIG. 20 is a schematic diagram illustrating an exemplary hardware environment that can be used to implement the embodiments of the invention.

A representative hardware environment for practicing the embodiments of the invention is depicted in FIG. 20. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the corresponding structures, materials, acts, and equivalents of all means or step plus function elements in the claims below are intended to include any structure, material, or act for performing the function in combination with other claimed elements as specifically claimed. Additionally, it should be understood that the above-description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. Well-known components and processing techniques are omitted in the above-description so as to not unnecessarily obscure the embodiments of the invention.

Finally, it should also be understood that the terminology used in the above-description is for the purpose of describing particular embodiments only and is not intended to be limiting of the invention. For example, as used herein, the singular forms "a", "an" and "the" are intended to include the plural forms as well, unless the context clearly indicates otherwise. Furthermore, as used herein, the terms "comprises", "comprising," and/or "incorporating" when used in this specification, specify the presence of stated features, integers, steps, operations, elements, and/or components, but do not preclude the presence or addition of one or more other features, integers, steps, operations, elements, components, and/or groups thereof.

What is claimed is:

1. A method of automating runtime failure analysis for a computer application: operating within a runtime environment, the method comprising:
    monitoring non-faulty application traces of said computer application with said runtime environment during fault-free activities to create non-faulty runtime signatures for said computer application;
    storing said non-faulty runtime signatures;
    detecting a faulty application trace of said computer application,
    comparing said faulty application trace with said non-faulty runtime signatures to identify fault attributes; and
    outputting said fault attributes.

2. The method according to claim 1, said monitoring of said non-faulty application traces provides non-faulty attributes of said computer application, said method further comprising:
    sorting said non-faulty attributes into groups of attributes;
    merging said groups of attributes to form said application signatures; and
    removing runtime variants from said application signatures.

3. The method according to claim 1, said monitoring of said non-faulty application traces provides information regarding system calls, including system call number, parameters, return value and error number; signal numbers; environment names and values; resource limits; access control attributes including user and group identification values; and a call graph of system calls.

4. The method according to claim 1, said monitoring of said non-faulty application traces comprises generating a call graph of system calls in a process comprising:
    adding a node to said call graph for each system call based on a system call memory context indicating from where within said computer application each system call was invoked;
    adding an arc from a parent node to each newly added node; and
    merging nodes of the same system call type having the same parent node.

5. The method according to claim 1, said comparing comprising comparing a call graph of said faulty application trace with call graphs of non-faulty application traces of said application signatures.

6. The method according to claim 1, further comprising ranking said fault attributes found by assigning a higher weight to fault attributes found earlier relative to fault attributes found later.

7. A method of automating runtime failure analysis for a computer application operating within a runtime environment, the method comprising:
    monitoring non-faulty application traces of said computer application with said runtime environment during fault-free activities to create non-faulty runtime signatures for said computer application, said non-faulty application traces comprising interactions between said computer application and said runtime environment, said non-faulty application traces being gathered during multiple runs of said computer application;
    storing said non-faulty runtime signatures;
    detecting a faulty application trace of said computer application, said faulty application trace comprising interactions between said computer application and said runtime environment;
    comparing said faulty application trace with said non-faulty runtime signatures to identify fault attributes; and
    outputting said fault attributes.

8. The method according to claim 7, said monitoring of said non-faulty application traces provides non-faulty attributes of said computer application, said method further comprising:
    sorting said non-faulty attributes into groups of attributes;
    merging said groups of attributes to form said application signatures; and
    removing runtime variants from said application signatures.

9. The method according to claim 7, said monitoring of said non-faulty application traces provides information regarding system calls, including system call number, parameters, return value and error number; signal numbers; environment names and values; resource limits; access control attributes including user and group identification values; and a call graph of system calls.

10. The method according to claim 7, said monitoring of said non-faulty application traces comprises generating a call graph of system calls in a process comprising:
adding a node to said call graph for each system call based on a system call memory context indicating from where within said computer application each system call was invoked;
adding an arc from a parent node to each newly added node; and
merging nodes of the same system call type having the same parent node.

11. The method according to claim 7, said comparing comprising comparing a call graph of said faulty application trace with call graphs of non-faulty application traces of said application signatures.

12. The method according to claim 7, further comprising ranking said fault attributes found by assigning a higher weight to fault attributes found earlier relative to fault attributes found later.

13. A method of automating runtime failure analysis for a computer application operating within a runtime environment, the method comprising:
monitoring non-faulty application traces of said computer application with said runtime environment during fault-free activities to create non-faulty runtime signatures for said computer application, said non-faulty application traces comprising interactions between said computer application and said runtime environment, said non-faulty application traces being gathered during multiple runs of said computer application;
storing said non-faulty runtime signatures;
detecting a faulty application trace of said computer application, said faulty application trace comprising interactions between said computer application and said runtime environment;
comparing said faulty application trace with said non-faulty runtime signatures by comparing a call graph of said faulty application trace with call graphs of non-faulty application traces of said application signatures to identify fault attributes;
ranking said fault attributes based on: giving more weight to fault attributes that are invariants and comprise fault attributes with a constant value; and giving more weight to fault attributes located closer to a head of said call graph of said faulty application trace; and
outputting said fault attributes.

14. The method according to claim 13, said monitoring of said non-faulty application traces provides non-faulty attributes of said computer application, said method further comprising:
sorting said non-faulty attributes into groups of attributes;
merging said groups of attributes to form said application signatures; and
removing runtime variants from said application signatures.

15. The method according to claim 13, said monitoring of said non-faulty application traces provides information regarding system calls, including system call number, parameters, return value and error number; signal numbers; environment names and values; resource limits; access control attributes including user and group identification values; and a call graph of system calls.

16. The method according to claim 13, said monitoring of said non-faulty application traces comprises generating a call graph of system calls in a process comprising:
adding a node to said call graph for each system call based on a system call memory context indicating from where within said computer application each system call was invoked;
adding an arc from a parent node to each newly added node; and
merging nodes of the same system call type having the same parent node.

17. A computer program storage device comprising a computer storage medium readable by computer, storing instructions executable by said computer to perform a method of automating runtime failure analysis for a computer application operating within a runtime environment, said method comprising:
monitoring non-faulty application traces of said computer application with said runtime environment during fault-free activities to create non-faulty runtime signatures for said computer application;
storing said non-faulty runtime signatures;
detecting a faulty application trace of said computer application,
comparing said faulty application trace with said non-faulty runtime signatures to identify fault attributes; and
outputting said fault attributes.

18. The computer program storage device according to claim 17, said monitoring of said non-faulty application traces provides non-faulty attributes of said computer application, said method further comprising:
sorting said non-faulty attributes into groups of attributes;
merging said groups of attributes to form said application signatures; and
removing runtime variants from said application signatures.

19. The computer program storage device according to claim 17, said monitoring of said non-faulty application traces provides information regarding system calls, including system call number, parameters, return value and error number; signal numbers; environment names and values; resource limits; access control attributes including user and group identification values; and a call graph of system calls.

20. The computer program storage device according to claim 17, said monitoring of said non-faulty application traces comprises generating a call graph of system calls in a process comprising:
adding a node to said call graph for each system call based on a system call memory context indicating from where within said computer application each system call was invoked;
adding an arc from a parent node to each newly added node; and
merging nodes of the same system call type having the same parent node.

* * * * *